(12) United States Patent
Kano

(10) Patent No.: US 7,206,040 B2
(45) Date of Patent: Apr. 17, 2007

(54) BACKLIGHT AND FRONTLIGHT, INTERMEDIATE LIGHT GUIDE, COVER MEMBER, AND LIQUID CRYSTAL DISPLAY

(75) Inventor: Mitsuru Kano, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 10/375,830

(22) Filed: Feb. 26, 2003

(65) Prior Publication Data

US 2003/0160911 A1  Aug. 28, 2003

(30) Foreign Application Priority Data

Feb. 27, 2002 (JP) .............................. 2002-052280

(51) Int. Cl.
*G02F 1/13357* (2006.01)
*F21V 7/04* (2006.01)

(52) U.S. Cl. ............................ 349/67; 349/62; 349/65; 362/616; 362/626

(58) Field of Classification Search ................. 349/65, 349/67, 63; 362/31, 616, 625, 626
See application file for complete search history.

(56) References Cited

U.S. PATENT DOCUMENTS 5,664,862 A * 9/1997 Redmond et al. ............. 362/31
5,673,128 A * 9/1997 Ohta et al. ..................... 349/62
5,815,227 A * 9/1998 Lee .............................. 349/67
6,104,453 A    8/2000 Watanabe
6,295,105 B1 * 9/2001 Lee et al. ...................... 349/65
6,369,867 B1 * 4/2002 Ge .............................. 349/73
6,474,826 B1 * 11/2002 Tanaka et al. ................ 362/31
6,636,283 B2 * 10/2003 Sasagawa et al. ............. 349/65
6,752,504 B2 * 6/2004 Lee et al. ...................... 362/27
6,789,910 B2 * 9/2004 Kimura et al. .............. 362/600

FOREIGN PATENT DOCUMENTS

EP    1 113 218 A1   7/2001
EP    1 306 609 A1   5/2003

* cited by examiner

*Primary Examiner*—Andrew Schechter
(74) *Attorney, Agent, or Firm*—Brinks Hofer Gilson & Lione

(57) ABSTRACT

A backlight is disposed on a rear surface side of a subject to be irradiated and illuminates the subject to be irradiated from the rear surface side. The backlight includes: a light guide plate; an intermediate light guide disposed along an end surface on one side of the light guide plate; and a light source disposed to an end portion of the intermediate light guide. One surface side of the light guide plate is formed into a reflection surface on which a concavoconvex shape is formed so as to reflect light propagating inside thereof. The other surface side of the light guide plate is formed into an exit surface that outputs the light reflected by the reflection surface. The reflection surface includes a plurality of grooves that are formed of a gentle slope portion and a steep slope portion. The subject to be irradiated is disposed outside of the exit surface.

18 Claims, 11 Drawing Sheets

BACKLIGHT AND FRONTLIGHT, INTERMEDIATE LIGHT GUIDE, COVER MEMBER, AND LIQUID CRYSTAL DISPLAY

BACKGROUND OF THE INVENTION

1. Field of the Invention

The present invention relates to a structure preferable as a backlight or a frontlight for use in a liquid crystal display device, and a liquid crystal display device provided with the backlight or the frontlight.

2. Description of the Related Art

FIG. 20 is a diagrammatic sectional view showing one example of an existing transmissive liquid crystal display device, and a liquid crystal display device 100 in the example comprises a liquid crystal display unit 120 and a backlight 110 disposed at a rear surface side of the liquid crystal display unit 120.

The backlight 110 is constituted so that light from a long light source 113 may be allowed to enter into a light guide plate 112 from one end surface (incidence surface 112a) thereof and to exit from one side surface (exit surface 112b) that faces the liquid crystal unit 120 in the light guide plate 112. On the other side surface 112c on a side that faces the exit surface 112b of the light guide plate 112, a prism sheet 114 and a white sheet 115 are disposed in this order. Furthermore, in order to integrally hold constituent components of the backlight 110, a cover-like holding member 116 that can accommodate in one lump the long light source 113, the light guide plate 112, the prism sheet 114 and the white sheet 115 is disposed. Furthermore, the white sheet 115 that is disposed on a rear surface side of the light guide plate 112 has light diffusion properties and light reflection properties, still furthermore between the light guide plate 112 and the white sheet 115 the prism sheet 114 is disposed, and thereby light diffusion properties and uniformity of a brightness distribution are improved. Furthermore, as the long light source 113, a cold cathode tube has been used.

However, in a backlight of a smaller display device such as an information terminal device and so on, since the cold cathode tube, requiring an inverter and so on, is too large in the power consumption and results in largely consuming a battery, instead of the cold cathode tube a light source that uses an EL (electro-luminescence) element has been widely adopted.

However, when an EL element is used as a light source of this kind of a display device, in order to obtain brightness of substantially several Cd/m$^2$, power consumption such large as 4 to 5 mW/cm$^2$ is necessary, accordingly there is a problem in that despite of larger power consumption, the brightness is low.

Furthermore, in the EL element, in order to allow the element itself to emit, an inverter is necessary in an amplitude circuit, and a problem results in that the inverter becomes a noise source of a liquid crystal display device. So far, as a countermeasure to the inverter noise, it has been necessary to provide the liquid crystal display device with a noise countermeasure circuit and noise shield means, resulting in higher cost. Furthermore, the inverter, in view of a circuit, is disadvantageous in raising the cost.

Furthermore, since the EL element has disadvantages in that the emission life is relatively short, for a longer use, component replacement and maintenance are necessary. For instance, in the case of an ordinary EL element, in terms of a half decay time when brightness becomes one half the initial brightness, the emission life is substantially 5000 h at the longest and substantially 2500 h at the shortest. Accordingly, a light source that has increased lifetime is in demand.

The present invention provides a backlight that is lower in power consumption, exhibits higher brightness, has a longer lifetime and generates less noise, and a liquid crystal display device provided therewith.

SUMMARY OF THE INVENTION

In order to overcome the above problems, a backlight according to the invention is a backlight that is disposed on a rear surface side of a subject to be irradiated and illuminates the subject to be irradiated from the rear surface side, the backlight including a light guide plate, an intermediate light guide disposed along an end surface of one side of the light guide plate, and a light source disposed to the intermediate light guide, one surface side of the light guide plate being formed into a reflection surface on which a concavoconvex shape is formed to reflect light traveling inside thereof, the other surface side of the light guide plate being formed into an exit surface that lets exit light reflected by the reflection surface, on the reflection surface a plurality of grooves that are formed of a gentle slope portion and a steep slope portion that has an angle of inclination steeper than that of the gentle slope portion being continuously formed in stripe, outside of the exit surface the subject to be irradiated being disposed.

Since the light exited from the light source can be reflected at the steep slope portion and irradiated from the exit surface of the light guide plate onto the subject to be irradiated, the subject to be irradiated can be illuminated from a rear side thereof, resulting in allowing functioning as a backlight.

In order to overcome the above problems, in a backlight according to the invention, the light source is made of a light-emitting diode having any one of green, bluish green, blue, orange, red, and yellowish green color.

When the light-emitting diode having any one color of green, bluish green, blue, orange, red, and yellowish green color is used as a light source, the light-emitting diode can be cheaply obtained, resulting in contributing to cost reduction as the light source. Furthermore, in comparison with a structure that uses an EL element as the light source, since there is no need of noise countermeasures, a shield and a noise reduction circuit are not needed, resulting in contributing to the cost reduction.

Furthermore, since the light-emitting diode having one of these colors is higher in the obtained brightness relative to the power consumption, a brighter backlight can be cheaply provided.

In order to overcome the above problems, in the backlight according to the invention, a cover member having at least a reflection surface cover portion that covers a side end portion on a reflection surface side of the light guide plate, a light guide cover portion that covers the intermediate light guide, and an exit surface cover portion that covers a side end portion on the exit surface side of the light guide plate is attached so as to cover at least the intermediate light guide and the side end portion of the light guide plate.

When the cover member is disposed on front and rear sides of a side end portion of the light guide plate and a periphery side of the intermediate light guide, light leakage from a side end portion side of the light guide plate and the periphery side of the intermediate light guide can be reduced, light introduced into the light guide plate can be increased, resulting in an improvement in the brightness as the backlight.

In order to overcome the above problems, in the backlight according to the invention, a reflection surface is formed on an inner surface of the cover member.

When the reflection surface is formed on an inner surface of the cover member, an amount of light that is reflected inside of the intermediate light guide and input into the light guide plate side can be increased, resulting in an improvement in the brightness as the backlight.

When a semi-transmissive liquid crystal display unit or a transmissive liquid crystal display unit is applied as the subject to be irradiated of the backlight according to the invention, a liquid crystal display unit of brighter display can be provided.

In order to overcome the above problems, a liquid crystal display device according to the invention includes a light guide plate, an intermediate light guide disposed along an end surface of one side of the light guide plate, and a light source disposed to an end portion of the intermediate light guide, one surface side of the light guide plate being formed into a reflection surface on which a concavoconvex shape is formed to reflect light traveling inside thereof, the other surface side of the light guide plate being formed into an exit surface that lets exit light reflected by the reflection surface, on the reflection surface a plurality of grooves that are formed of a gentle slope portion and a steep slope portion that has an angle of inclination steeper than that of the gentle slope portion being continuously formed in stripe, and outside of the exit surface a transmissive or semi-transmissive liquid crystal display unit being disposed.

Since light exited from the light source can be reflected at the steep slope portion and irradiated from the exit surface of the light guide plate onto the subject to be irradiated, the transmissive or semi-transmissive liquid crystal display unit can be illuminated from a rear side thereof.

In order to overcome the above problems, in the liquid crystal display device according to the invention, the liquid crystal display unit is a transmissive or semi-transmissive black-and-white display type.

In order to overcome the problems, in the liquid crystal display device according to the invention, the light source is formed of a light-emitting diode having any one color of green, bluish green and blue color.

When the light-emitting diode is used as a light source, in comparison with an EL element, the power consumption is smaller, and higher brightness relative to the power consumption can be obtained. Furthermore, the light-emitting diode having any one color of green, bluish green and blue color can be easily obtained and is cheap, resulting in contributing to the cost reduction. Furthermore, when the light-emitting diode having any one color of these colors is used as a light source, although colored light illuminates from a rear surface side the liquid crystal display unit, there is no problem when the liquid crystal display unit is not a color display type but a black-and-white display type transmissive or semi-transmissive type, resulting in obtaining a liquid crystal display unit having brighter display mode at low cost.

The steep slope portion and the gentle slope portion that form the groove are preferably disposed alternately.

Since the light outputted from the light source can be reflected at the steep slope portion and irradiated from the exit surface of the light guide plate onto the subject to be irradiated, the subject to be irradiated can be illuminated from a rear side thereof, thereby allowing functioning as a backlight, resulting in obtaining a liquid crystal display unit having a brighter display mode.

In order to overcome the above problems, in the liquid crystal display device according to the invention, a cover member having at least a reflection surface cover portion that covers a side end portion on a reflection surface side of the light guide plate, a light guide cover portion that covers the intermediate light guide, and an exit surface cover portion that covers a side end portion on the exit surface side of the light guide plate is attached so as to cover at least the intermediate light guide and the side end portion of the light guide plate.

When the cover member is disposed on front and rear sides of a side end portion of the light guide plate and a periphery side of the intermediate light guide, light leakage from a side end portion side of the light guide plate and the intermediate light guide side can be suppressed, and light introduced into the light guide plate can be increased, resulting in an improvement in the brightness as the backlight, and further resulting in providing a liquid crystal display unit having a brighter display mode.

In order to overcome the above problems, in the liquid crystal display device according to the invention, a reflection surface may be formed on an inner surface of the cover member.

Since the light is further reflected at the inner surface of the cover member and light leakage at the intermediate light guide portion can be reduced, an amount of light that is input from the intermediate light guide into the light guide plate side can be increased, resulting in an improvement in the brightness as the backlight, further resulting in providing a liquid crystal display unit having a brighter display mode.

A frontlight according to the invention is a frontlight that is disposed on a front surface side of a subject to be irradiated and illuminates the subject to be irradiated from a front surface side, the frontlight including a light guide plate, an intermediate light guide disposed along an end surface on one side of the light guide plate, and a light source disposed to the intermediate light guide, one surface side of the light guide plate being formed into a reflection surface on which a concavoconvex shape is formed to reflect light traveling inside thereof, the other surface side of the light guide plate being formed into an exit surface that lets exit light reflected by the reflection surface, on the reflection surface a plurality of grooves that are formed of a gentle slope portion and a steep slope portion that has an angle of inclination steeper than that of the gentle slope portion being continuously formed in stripe, and the light source being formed of a light-emitting diode having any one color of green, bluish green, blue, orange, red and yellowish green color.

Since the light exited from the light source can be reflected at the steep slope portion and irradiated from the exit surface of the light guide plate onto the subject to be irradiated, the subject to be irradiated can be illuminated from a rear side thereof, resulting in functioning as a frontlight. When a light-emitting diode having any one color of green, bluish green, blue, orange, red, and yellowish green color is used as a light source, the light-emitting diode can be cheaply obtained, resulting in contributing to cost reduction as the light source. Furthermore, in comparison with a structure that uses an EL element as the light source, since there is no need of noise countermeasures, a shield and a noise reduction circuit are not needed, resulting in a reduction in cost.

Furthermore, since the light-emitting diode having one of these colors is higher in the obtained brightness relative to the power consumption, a brighter frontlight can be cheaply provided.

In the frontlight according to the invention, a cover member having at least a reflection surface cover portion that covers a side end portion on a reflection surface side of the light guide plate, a light guide cover portion that covers the intermediate light guide, and an exit surface cover portion that covers a side end portion on the exit surface side of the light guide plate is attached so as to cover at least the intermediate light guide and a side end portion of the light guide plate.

When the cover member is disposed on front and rear sides of a side end portion of the light guide plate and a periphery side of the intermediate light guide, light leakage from a side end portion side of the light guide plate and the periphery side of the intermediate light guide can be made less, light introduced into the light guide plate can be increased, resulting in an improvement in the brightness as the frontlight.

In the frontlight according to the invention, the cover member is made of a metal plate, and on an inner surface side thereof a reflection surface is formed.

When a reflection surface is formed on an inner surface of the cover member, an amount of light that is reflected inside of the intermediate light guide and input into the light guide plate side can be increased, resulting in an improvement in the brightness as the frontlight.

In the frontlight according to the invention, the subject to be irradiated is a black-and-white display reflective liquid crystal display unit.

When the light-emitting diode having one of the previous colors is used as the light source, although colored light illuminates the liquid crystal display unit from a rear surface side, there is no particular problem when the liquid crystal display unit is not a color display type but a black-and-white display reflective type, resulting in obtaining at cheap cost a liquid crystal display unit having a brighter display mode.

A liquid crystal display device according to the invention includes a frontlight including a light guide plate, an intermediate light guide disposed along an end surface on one side of the light guide plate, and a light source disposed to an end portion of the intermediate light guide, one surface side of the light guide plate being formed into a reflection surface on which a concavoconvex shape is formed to reflect light traveling inside thereof, the other surface side of the light guide plate being formed into an exit surface that lets exit light reflected by the reflection surface, on the reflection surface a plurality of grooves that are formed of a gentle slope portion and a steep slope portion that has an angle of inclination steeper than that of the gentle slope portion being continuously formed in stripe, and the light source being formed of a light-emitting diode having any one color of green, bluish green, blue, orange, red and yellowish green color; and a liquid crystal display unit disposed outside of the exit surface of the frontlight.

In the liquid crystal display device according to the invention, the liquid crystal display unit is a reflective black-and-white display type.

Furthermore, when the light-emitting diode having one of the previous colors is used as the light source, although colored light illuminates the liquid crystal display unit from a rear surface side, there is no particular problem when the liquid crystal display unit is not a color display type but a black-and-white display reflective type, resulting in obtaining at cheap cost a liquid crystal display unit having a brighter display mode.

In the liquid crystal display device according to the invention, a cover member having at least a reflection surface cover portion that covers a side end portion on a reflection surface side of the light guide plate, a light guide cover portion that covers the intermediate light guide, and an exit surface cover portion that covers a side end portion on the exit surface side of the light guide plate is attached so as to cover at least the intermediate light guide and the side end portion of the light guide plate.

When the cover member is disposed on front and rear sides of a side end portion of the light guide plate and a periphery side of the intermediate light guide, light leakage from a side end portion side of the light guide plate and the periphery side of the intermediate light guide can be made less, light introduced into the light guide plate can be increased, resulting in an improvement in the brightness as the frontlight.

In the liquid crystal display device according to the invention, the cover member is made of a metal plate, and on an inner surface thereof a reflection surface is formed.

When a reflection surface is formed on an inner surface of the cover member, an amount of light that is reflected inside of the intermediate light guide and input into the light guide plate side can be increased, resulting in an improvement in the brightness as the frontlight.

DESCRIPTION OF THE PREFERRED EMBODIMENTS

In the following, embodiments of the invention will be explained with reference to the drawings. However, the present invention is not restricted only to the following embodiments. Furthermore, in the respective drawings, scales of the respective constituent members are appropriately altered for the sake of illustration convenience.

(First Embodiment)

Figure 1:
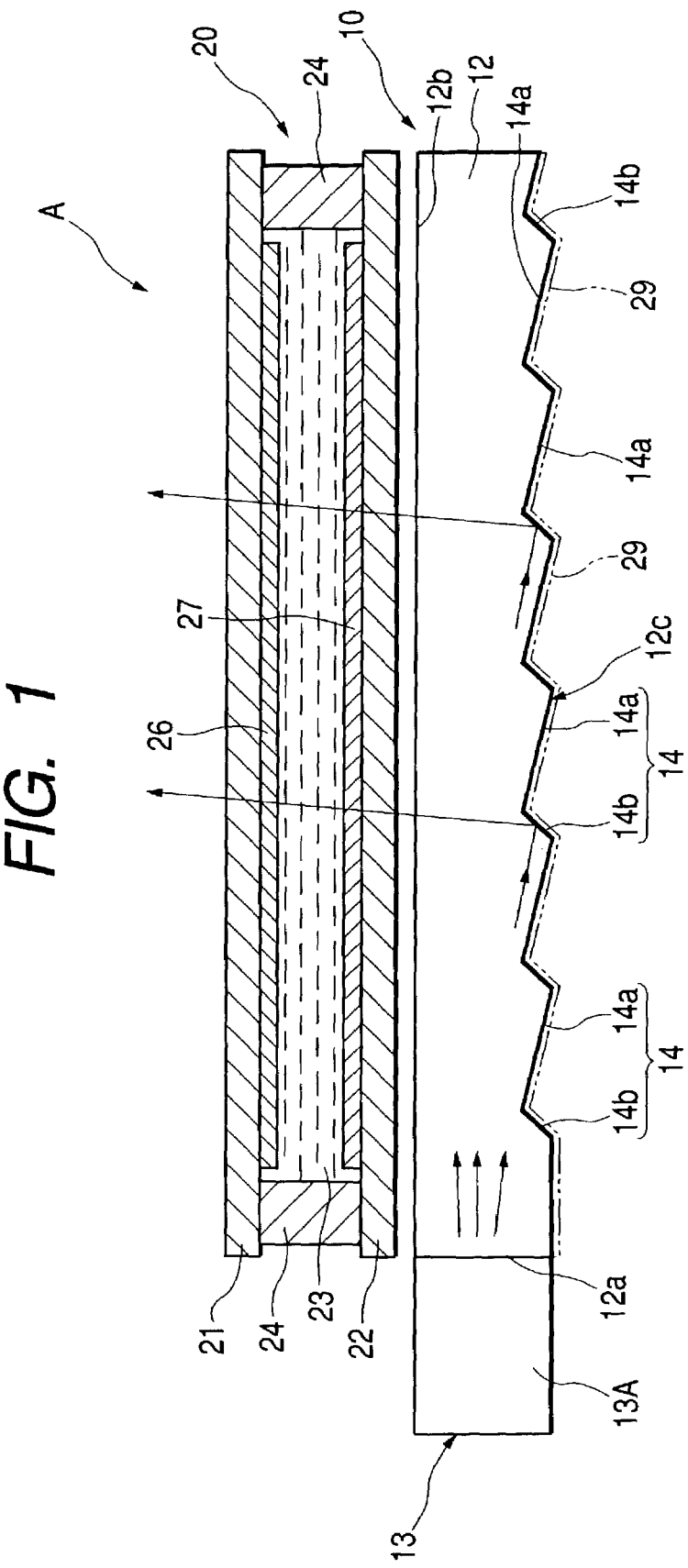
FIG. 1 is a sectional view showing one embodiment of a liquid crystal display device provided with a backlight according to the invention.
Figure 2:
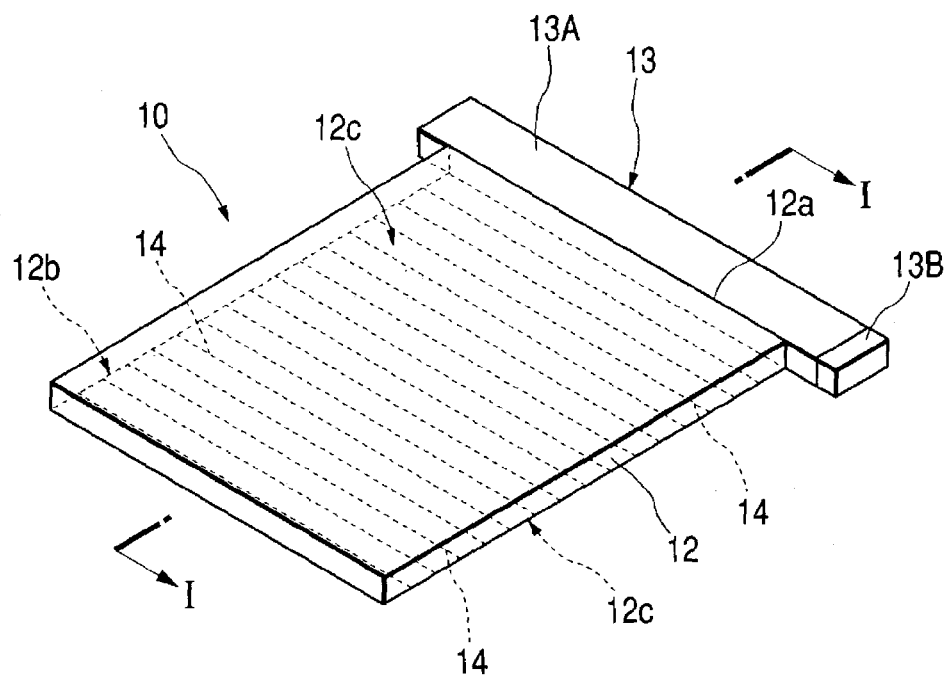
FIG. 2 is a perspective view of the backlight.
Figure 3:
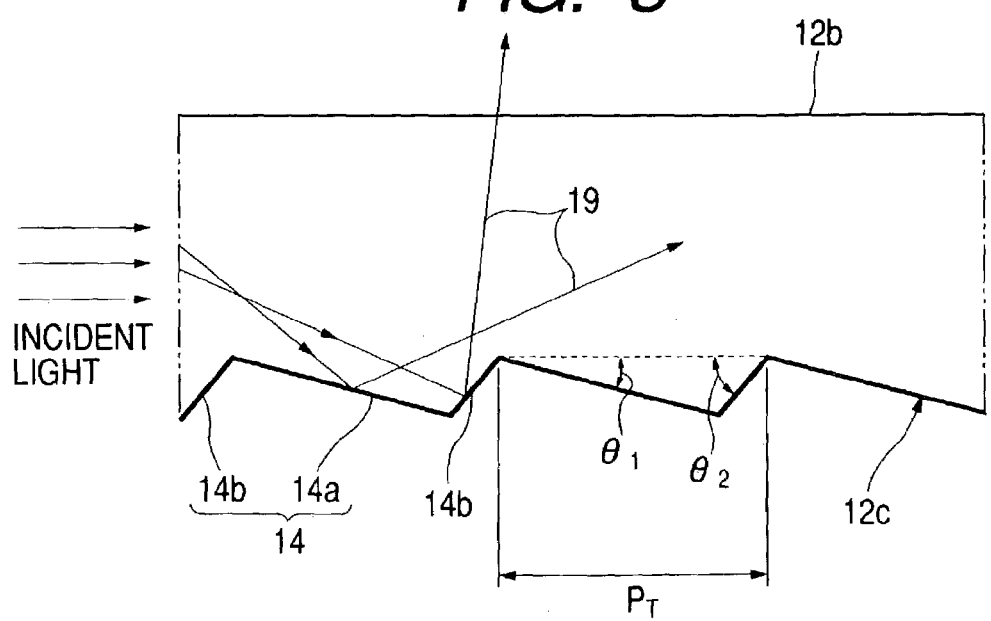
FIG. 3 is a partially enlarged view of the backlight.

FIG. 1 is a sectional block diagram of a transmissive or semi-transmissive liquid crystal display device provided with a backlight (a planar light-emitting device) that is a first embodiment of the present invention, FIG. 2 is a perspective view of the backlight, and FIG. 3 is a side view showing with part of the backlight enlarged. A section direction in FIG. 1 is a direction along a I—I line in FIG. 2.

A liquid crystal display device A according to the embodiment comprises a liquid crystal display unit 20 and a backlight 10 that is disposed at a rear surface side of the liquid crystal display unit 20 and illuminates the liquid crystal display unit 20 from the rear surface side.

The liquid crystal display unit 20 in this mode is a transmissive type or a semi-transmissive type, and is roughly constituted by connecting and integrating, with a sealing member 24, a transparent first substrate 21 and a transparent second substrate 22 that are made of glass or the like and face each other with a liquid crystal layer 23 interposed therebetween. On the liquid crystal layer 23 sides of the first substrate 21 and the second substrate 22, display circuit layers 26 and 27 are formed, respectively.

The display circuit layers 26 and 27 contain, though not shown in the drawing, an electrode layer made of a transparent conductive film for driving the liquid crystal layer 23, an alignment film for controlling alignment of the liquid crystal layer 23 and so on. Furthermore, in the display circuit layers 26 and 27, when a driving mode of a liquid crystal is a simple matrix type, a transparent electrode and an alignment film are disposed, however when a liquid crystal driving mode is an active matrix type, in addition to pixel electrodes, pixel driving thin film transistors or thin film diodes are disposed, and various kinds of wirings for driving these are disposed. However, the driving mode of the liquid crystal is not made any particular distinction in the invention.

The liquid crystal display unit 20 according to the embodiment is a black-and-white display type liquid crystal display unit that is not provided with a color filter for color display.

The backlight 10 comprises a transparent light guide plate 12 and light source device 13. In the backlight 10, the light source device 13 is disposed on an end surface 12a side of a side therefrom light is introduced into the light guide plate 12.

Figure 4:
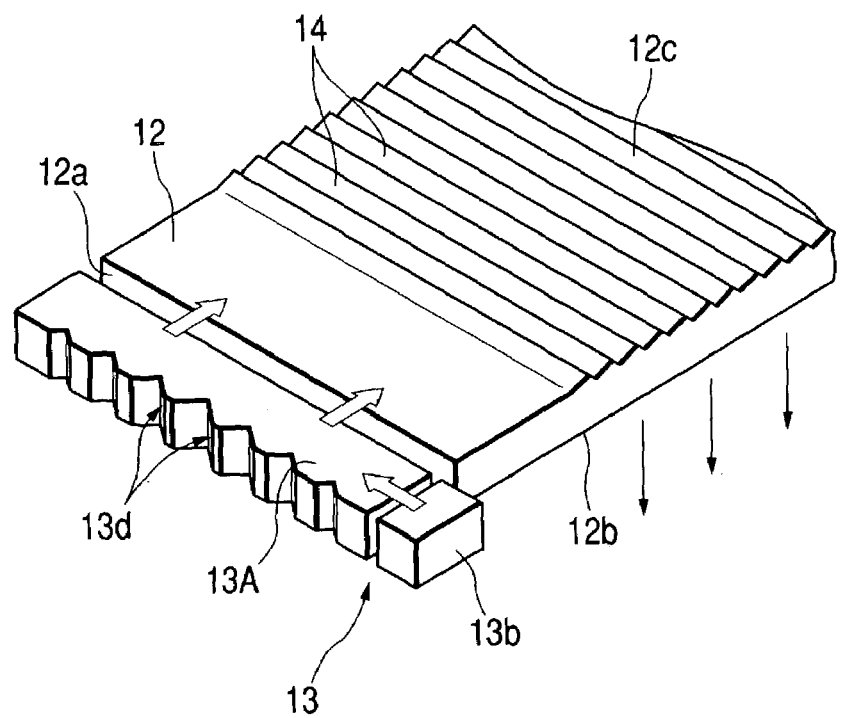
FIG. 4 is a perspective view in which the backlight is disposed upside down to show an intermediate light guide and a light-emitting portion thereof.

The light guide plate 12 is disposed on a rear surface side (outside of the substrate 22) of the liquid crystal display unit 20 and irradiates the light inputted from the light source device 13 onto the liquid crystal display unit 20, and is formed of a planar transparent acrylic resin plate and so on. As shown in FIGS. 2 and 4, on an end surface 12a (hereinafter, in some cases, referred to as an incidence surface 12a) of one side of the light guide plate 12, the light source device 13 is disposed, and light outputted from the light source device 13 is introduced through the incidence surface 12a into the light guide plate 12. A bottom surface of the light guide plate 12 (a surface on a side opposite to the liquid crystal display unit 20 side) is formed in a prism surface (reflection surface) 12c, and a top surface on the opposite side (a surface on the liquid crystal display unit 20 side) from the prism surface 12c is formed into a planar exit surface 12b.

As a material that constitutes the light guide plate 12, other than the acrylic resin, transparent resin materials such as polycarbonate resin and epoxy resin, and glass can be used. Furthermore, when specific examples are cited, though not particularly restricted thereto, ARTON (trade name: manufactured by JSR Corporation) or ZEONOA (trade name: manufactured by Nippon Zeon Co., Ltd.) can be preferably cited.

The exit surface 12b of the light guide plate 12 is a surface that is disposed facing the liquid crystal display unit 20 and from which light for illuminating the liquid crystal display unit 20 is outputted, and is formed into a smooth surface whose surface roughness (Ra) is, for instance, 10 nm or less.

On the prism surface 12c, in order to reflect light that propagates the inside of the light guide plate 12 and to change a propagation direction thereof, a plurality of grooves 14 having substantial V-shape in section is formed with a predetermined pitch so as to form a stripe-like pattern two-dimensionally. The groove 14 is asymmetrically formed of a gentle slope portion 14a formed inclined to the exit surface 12b and a steep slope portion 14b that is formed continuously with the gentle slope portion 14a and at an angle of inclination steeper than that of the gentle slope portion 14a, and the formation directions of the respective grooves 14 are aligned so as to extend in parallel with the incidence surface 12a of the light guide plate 12. A direction of the light guide plate 12 is preferably constituted so that as the gentle slope portion 14a becomes distant from the light source device 13, a thickness may gradually increase. That is, when the steep slope portion 14b is disposed so as to be gradually thinner as departs from the light source device 13, efficiency with which light outputted from the light source device 13 is reflected by the steep slope portion 14b and outputted from the exit surface 12b can be improved.

FIG. 3 is a side view showing with part of the light guide plate 12 enlarged. Reference numeral 19 in FIG. 3 shows an example of propagation paths of light that propagates the inside of the light guide plate 12. The light 19 outputted from the light source device 13 that is disposed on a left side from the drawing propagates the inside of the light guide plate 12 with reflections repeating at an inner surface of the light guide plate 12, and part thereof exits from the exit surface 12b of the light guide plate 12.

The light that is input from the light source device 13 into the light guide plate 12 side is not restricted to parallel light shown in FIG. 3, and light having various components of angle of incidence is input.

The propagation path of the light in the inside of the light guide plate 12 can vary depending on an angle of inclination theta 1 of the gentle slope portion 14a that constitutes the groove 14, an angle of inclination theta 2 of the steep slope portion 14b, and a pitch $P_T$ of the groove 14. Accordingly, by properly setting these angles of inclination theta 1 and theta 2 and the pitch $P_T$, uniformity of an amount of exit light in a plane of the exit surface 12b can be improved, and a bright line can be inhibited from being generated on the prism surface 12c side of the light guide plate 12.

For instance, when an angle (visual angle) at which a display screen of a liquid crystal display device 1 being obtained can be seen most brightly when the display screen is observed from various angles, that is, a visual angle at which brightness in the display screen becomes the maximum, would like to be set in the range ±10 degree with respect to a normal line of the display screen, it is preferable to set the angle of inclination theta 2 of the steep slope portion 14b at 40 degree or more and 50 degree or less, for instance at substantially 43 degree. Similarly, the angle of inclination theta 1 of the gentle slope portion 14a is preferably set in the range of 1.8 to 2.5 degree, for instance at substantially 2 degree.

Furthermore, the smaller the pitch $P_T$ of the grooves 14 is, the lower the amount of exit light from the backlight 10 becomes, that is, the lower the brightness of the liquid crystal display device 1 becomes. On the other hand, when the pitch $P_T$ is too large, the bright line is generated in the light guide plate 12, and unevenness of the brightness as the backlight 10 unfavorably tends to be generated. Accordingly, the pitch $P_T$ of the grooves 14 is preferably set in the range of 120 μm or more and 250 μm or less.

The light source device 13, as shown in FIGS. 2 and 4, is constituted of a quadratic intermediate light guide 13A made of acrylic resin or polycarbonate resin and a light source (light emitting element) 13B formed of an LED disposed at one end of a longer direction of the intermediate light guide 13A. Among side surfaces of the intermediate light guide 13A, on a surface on an opposite side from the light guide plate 12, a prism surface 13d having a triangular concavoconvex is formed. The light introduced from the light emitting element 13B into the intermediate light guide 13A is reflected by the prism surface 13d to change a propagation direction toward the light guide plate 12, and thereby the light from the light emitting element 13B is efficiently irradiated onto the incidence surface 12a of the light guide plate 12. The prism surface 13d is preferably covered with a light reflection film so as to improve a light reflection efficiency.

In FIG. 4, since up and down relationship of the light guide plate 12 is shown from a direction reversed from that of FIGS. 1 through 3, in FIG. 4 the grooves 14 are drawn so as to be formed on a top surface side of the light guide plate 12. Accordingly, since the exit surface 12b is directed downward in FIG. 4, the light is outputted downward.

As the LED (light-emitting diode) that is used as the light-emitting element 13B, one capable of emitting any one color of green, bluish green, blue, orange, red, and yellowish green color can be used. The light-emitting diodes capable of emitting these colors are characterized in that the power consumption is such small as in the range of substantially 2.0 to 2.5 mW/cm², a higher brightness such as in the range of substantially 5 to 10 cd/cm² can be easily obtained, a longer life such as 10,000 h or more can be obtained, the noise is generated with difficulty, and the cost is cheap (for instance, substantially 20 to 30 Japanese Yen a piece). The light-emitting diodes capable of emitting the light of these colors, because of coloring, cannot be applied as a backlight of a color display type liquid crystal display unit. However, these can be applied to a black-and-white display type liquid crystal display unit 20 like the embodiment without problems. Accordingly, when the light-emitting diode having one of the respective colors is used, a backlight that is low in the power consumption and has a brighter display mode with respect to the low power consumption can be obtained. Furthermore, among these, when the brightness is further demanded, a green light-emitting diode may be altered to one of yellowish green color. Still furthermore, in order to give fashionability to the display, it is effective to use a light-emitting diode having a red color or orange color.

Although in the embodiment, as the light source device 13, one that is provided with the light-emitting element 13B formed of the light-emitting diode is used, as the light source device 13, any one of the light source devices that can irradiate the light uniformly on the incidence surface 12a of the light guide plate 12 can be preferably used. However, one that is formed of the light-emitting diode that is less in the power consumption, excellent in the emission efficiency, and cheap is preferable.

In the backlight 10 having the configuration shown in FIGS. 1 through 4, the light of green, bluish green or blue color outputted from the light-emitting element 13B is guided through the intermediate light guide 13A toward the light guide plate 12 side, reflected by the gentle slope portion 14b inside of the light guide plate 12 and outputted from the exit surface 12b toward the liquid crystal display unit 20 followed by passing through the transmissive or semi-transmissive liquid crystal display unit 20, and further followed by illuminating the liquid crystal display unit 20 from a rear side. The light-emitting diodes capable of emitting the light of these colors, because of coloring, cannot be applied as a backlight of a color display type liquid crystal display unit. However, these can be applied to a black-and-white display type liquid crystal display unit 20 like the embodiment without problems.

Furthermore, when the light-emitting diode of one of the respective colors is used, a backlight 10 that is low in the power consumption and has a brighter display mode with respect to the lower power consumption can be obtained.

The light-emitting diode capable of emitting one of these colors, being low in the power consumption and easier in obtaining higher brightness, can provide a brighter transmissive or semi-transmissive liquid crystal display unit 20. Furthermore, since the light-emitting diodes capable of emitting the colors, being longer in the life than the EL element and so on, more difficult to generate noise, and cheaper in the cost, permits the omission of a noise preventive mechanism at the liquid crystal display unit 20 side, contributing to lowering costs of the entire liquid crystal display device that is provided with the backlight 10.

Figure 5:
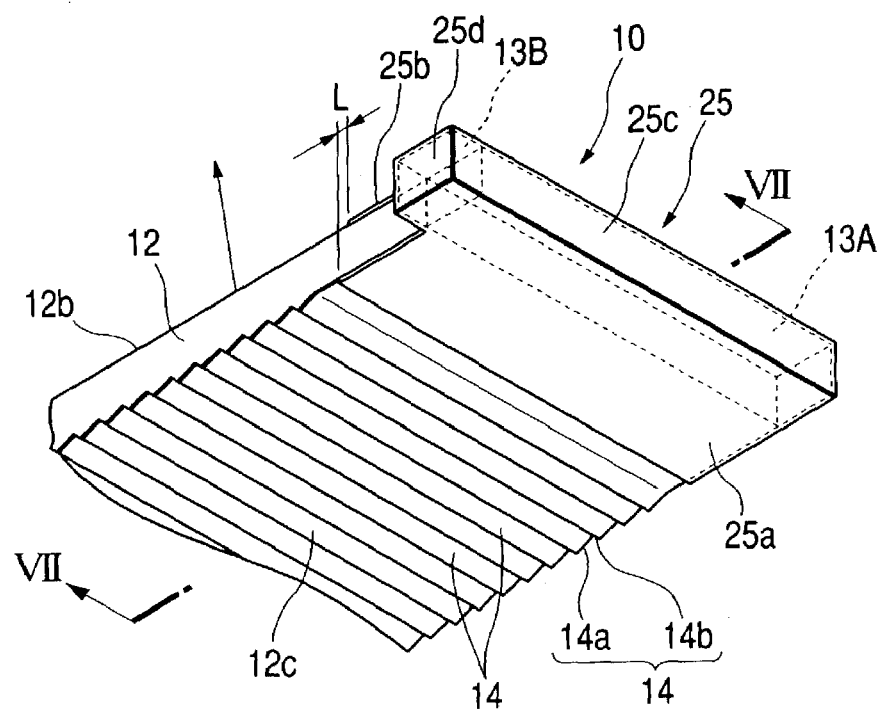
FIG. 5 is a perspective view when the backlight is seen from a bottom surface side.

FIG. 5 shows a second embodiment of a backlight according to the invention, and a backlight (planar light emitting device) B according to this embodiment is formed by attaching a cover member 25 to part of the light guide plate 12 according to the former embodiment.

The cover member 25 according to the embodiment is, as shown in FIG. 5, a metal cover member that is disposed so as to cover a bar-like intermediate light guide 13A, a light-emitting element 13B on one end side thereof, and a side end portion on an intermediate light guide 13A side of the light guide plate 12, and has a horseshoe sectional shape.

The cover member 25 is constituted of a reflection surface cover portion 25a that is a site disposed on a reflection surface side of the light guide plate 12, an exit surface cover portion 25b that is a site disposed on the exit surface side of the light guide plate 12, and a light guide cover portion 25c that is connected to the base portions and disposed facing the reflection surface 13d of the intermediate light guide 13A.

Figure 6:
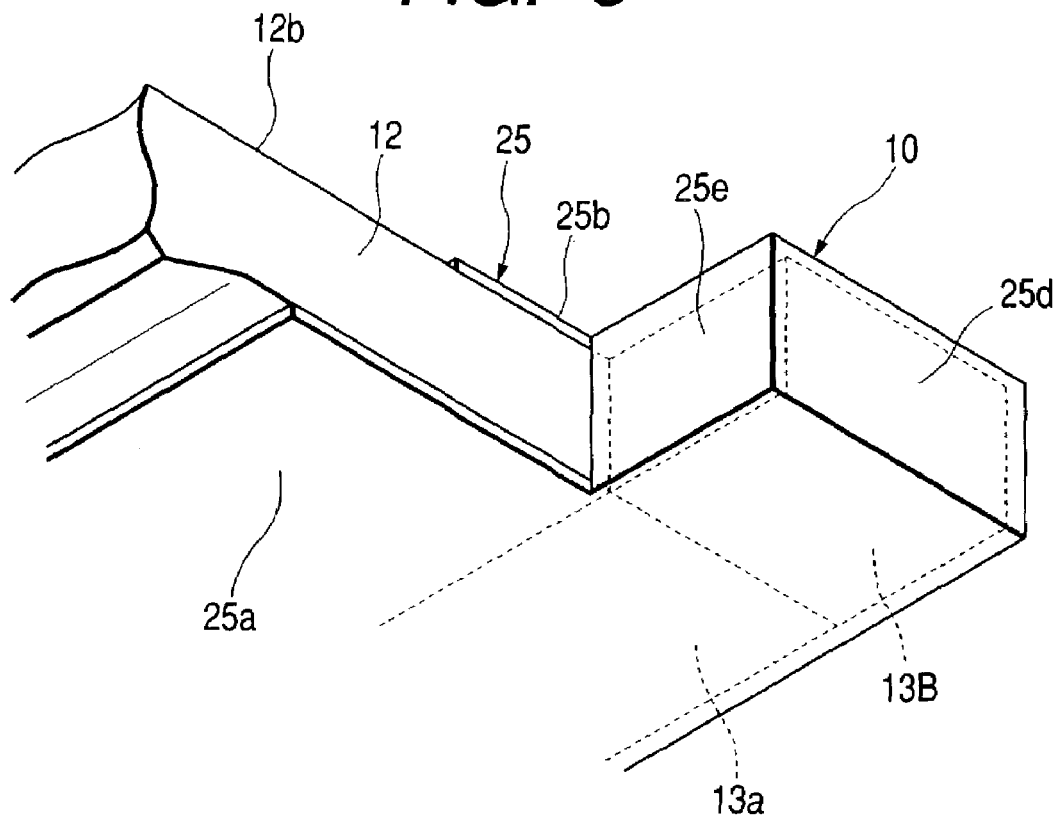
FIG. 6 is an enlarged view when part of a light guide plate and part of a cover member of the backlight are seen from a bottom surface side.

FIG. 6 is an enlarged view for explaining a state in which the cover member 25 according to the embodiment is adhered to the intermediate light guide 13A and the light-emitting element 13B.

As shown in the drawing, in the cover member 25 according to the embodiment, in order to cover the light-emitting element 13B projected from a side surface of the light guide plate 12, an outer surface cover portion 25d is formed so as to face an outer surface side (a side opposite to a surface that faces the intermediate light guide plate 13a) of the light-emitting element 13B, and a side surface cover portion 25e is formed so as to face a side surface on the light guide plate 12 side of the light-emitting element 13B. The outer surface cover portions 25d and 25e are preferably formed not so as to form a gap with the reflection surface cover portion 25a, the exit surface cover portion 25b and the light guide cover portion 25c, respectively. The cover portion 25d, when the outer surface side of the light-emitting element 13B is light-shielded not so as to leak light outside of the cover member 25, may not be disposed.

Figure 7:
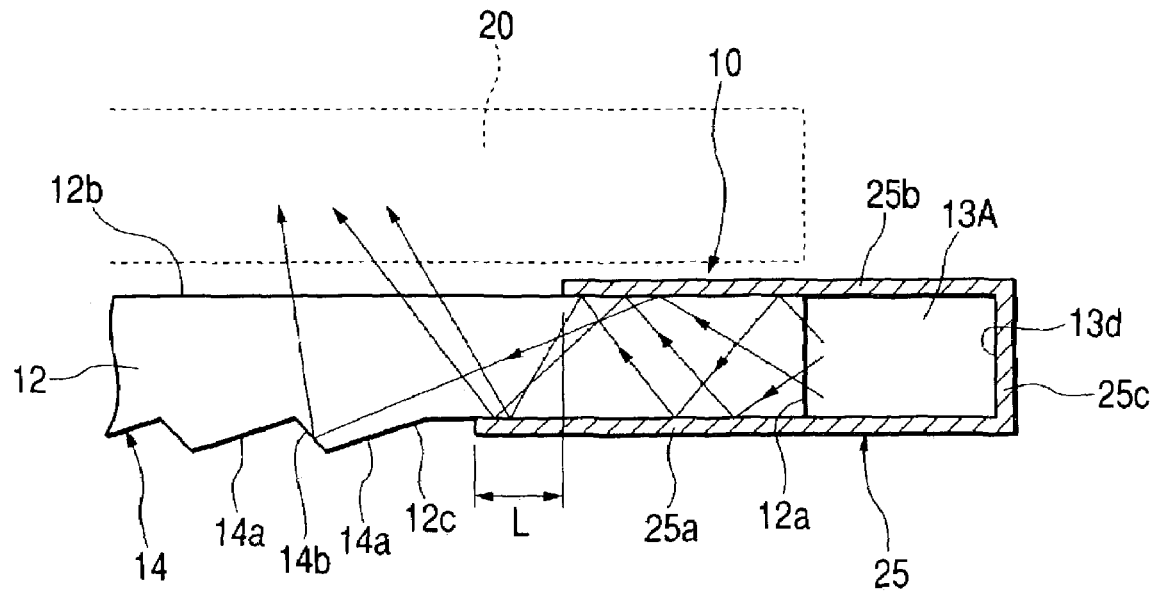
FIG. 7 is a diagram showing an layout of a partial section of the light guide plate of the backlight, a partial section of the cover member thereof, and a liquid crystal display unit.

One feature of the cover member 25 according to the embodiment is in that as shown in FIGS. 5 through 7, the reflection surface cover portion 25a is formed more projected in length to a light guide direction (a direction forwarding from the intermediate light guide 13A to the light guide plate 12) than the exit surface cover portion 25b, and a projection length L is set at 0.5 mm or more. By thus constituting, the backlight according to the embodiment can realize an appreciable improvement in the brightness. Furthermore, the projection length is preferably set at 0.7 mm or more, being more preferable to be 0.8 mm or more. By setting the projection length in the above range, a further improvement in the brightness can be realized. The operations thereof will be detailed in the following with reference to FIGS. 7 and 8.

Figure 8:
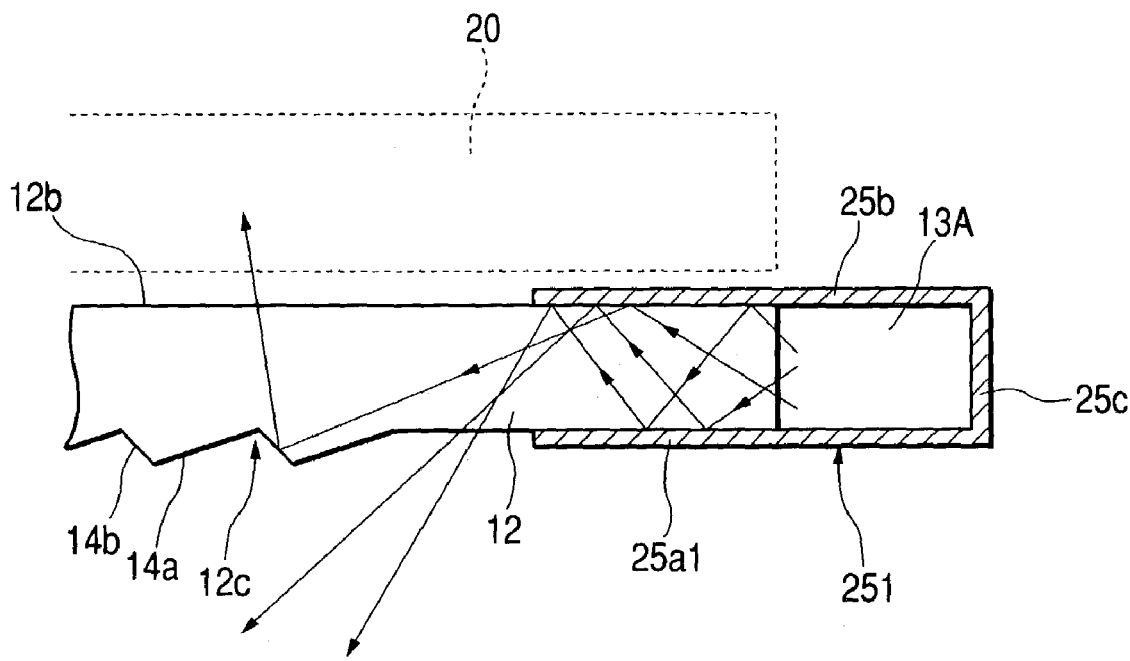
FIG. 8 is a diagram showing an layout of a partial section when a length of the cover member is partially altered and a liquid crystal display unit.

FIG. 7 is a partial sectional side view along a VII—VII line of the backlight shown in FIG. 5, and FIG. 8 is a partial sectional side view of a cover member 251 that has a structure in which a length in a light guide direction of the reflection surface cover portion 25a and that in the light guide direction of the exit surface cover portion 25b are made the same. In FIG. 8, a reflection surface cover portion 25a1 whose length is made the same as the length in the light guide direction of the exit surface cover portion 25b is shown.

First, in the configuration shown in FIG. 8, the cover member 251 having a horseshoe sectional shape grasps a side end portion of the light guide plate 12 from up and down with the intermediate light guide 13A accommodated inside thereof, and a length in the light guide direction of the cover member 251 on the prism surface 12c side of the light guide plate 12 is made substantially identical as that on the exit surface 12b side. In this structure, as shown in FIG. 8, light that is reflected by an inner surface side of a tip end portion of the exit surface cover portion 25b and propagates within the light guide plate 12 is outputted through the prism surface 12c of the light guide plate 12 below the backlight. The light, provided that the liquid crystal display unit 20 is disposed on a top surface side of the backlight, would not contribute to illumination of the liquid crystal display unit 20 and becomes waste light, resulting in not contributing to the display of the liquid crystal display unit 20.

On the other hand, in the backlight 10 according to the embodiment shown in FIG. 7, the cover member 25 having a horseshoe sectional shape accommodates the intermediate light guide 13A inside thereof and grasps the light guide plate 12 by tip ends thereof from up and down. In addition, the reflection surface cover portion 25a on the prism surface 12c side of the light guide plate 12 is formed longer in the light guide direction by the projection length L than the exit surface cover portion 25b on the exit surface 12b side of the light guide plate 12. In the backlight 10 thus configured, the light outputted from the intermediate light guide 13A, with reflections at an inner surface of the light guide plate 12 or an inner surface side of the cover member 25 repeating, propagates from the intermediate light guide 13A side to a direction toward the light guide plate 12 side. In the backlight 10 according to the embodiment, as shown in FIG. 7, of the light that is reflected at the inner surface side of the cover member 25, the light reflected at the inner surface side of the tip end portion of the exit surface cover portion 25b is further reflected at the inner surface side of the tip end portion of the reflection surface cover portion 25a and outputted from the exit surface 12b of the light guide plate 12 above the backlight 10. Accordingly, as shown in, for instance, FIG. 7, when the liquid crystal display unit 20 is disposed on a top surface side of the backlight 10, the light reflected at the tip end portion of the reflection surface cover portion 25a also can be utilized as light that contributes to the display of the liquid crystal display unit 20. Thus, since the backlight 10 according to the embodiment can increase an amount of exit light from the exit surface 12b of the light guide plate 12 and the light from the prism surface 12c of the light guide plate 12 can be suppressed from leaking, the backlight 10 according to the embodiment can realize an appreciable brightness improvement effect in comparison to the backlight having the structure shown in FIG. 8.

In the above-explained respective embodiments, a reflection film is not particularly disposed on an outer surface of the prism surface 12c of the light guide plate 12. However, a reflection film 29 high in the light reflectance such as Ag or Al may be disposed on the outer surface of the prism surface 12c as shown with a two dot chain line in FIG. 1 so as to further improve the light reflectance of the prism surface 12c. Furthermore, on an inner surface of the cover member 25, a light reflection film may be separately disposed to improve the light reflectance at the inner surface of the cover member 25. Still furthermore, although, in the above embodiment, an entire cover member 25 is made of a metal plate, the entire cover member 25 may be formed, not of a metal plate, but of a light reflection film.

Figure 9:
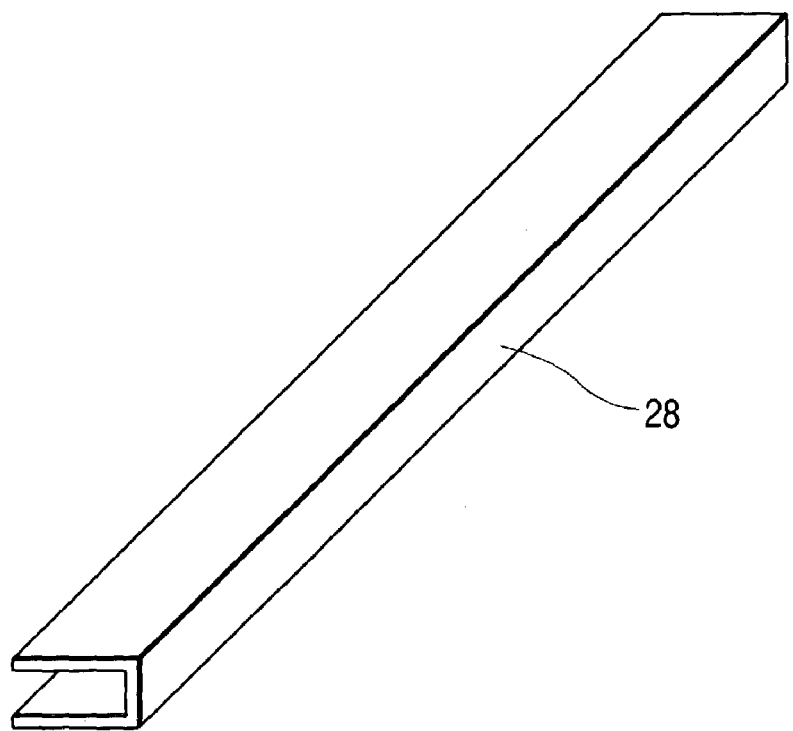
FIG. 9 is a perspective view showing one example of a reflector member that is attached to a light guide plate of the backlight.

Still furthermore, in the invention, a cover-type reflector member 28 having a horseshoe sectional shape such as shown in FIG. 9 may be attached at an end portion of the light guide plate 12 separately from the above cover member 25 so that light may be reflected by a light reflection surface disposed on an inner surface portion of the reflector member 28 and thereby exit light from the exit surface 12b of the light guide plate 12 may be increased. The reflector member 28 may be formed of the identical material as the cover member 25.

When the reflector member 28 is separately attached to the end portion side of the light guide plate 12, the light that may leak outside of the end portion side of the light guide plate 12 can be re-reflected and returned to the inside of the light guide plate 12. As a result, an amount of light that can be reflected at the steep slope surface portion 14b of the prism surface 12c can be increased, and thereby the brightness as the backlight 10 can be improved.

(Second Embodiment)

Figure 10:
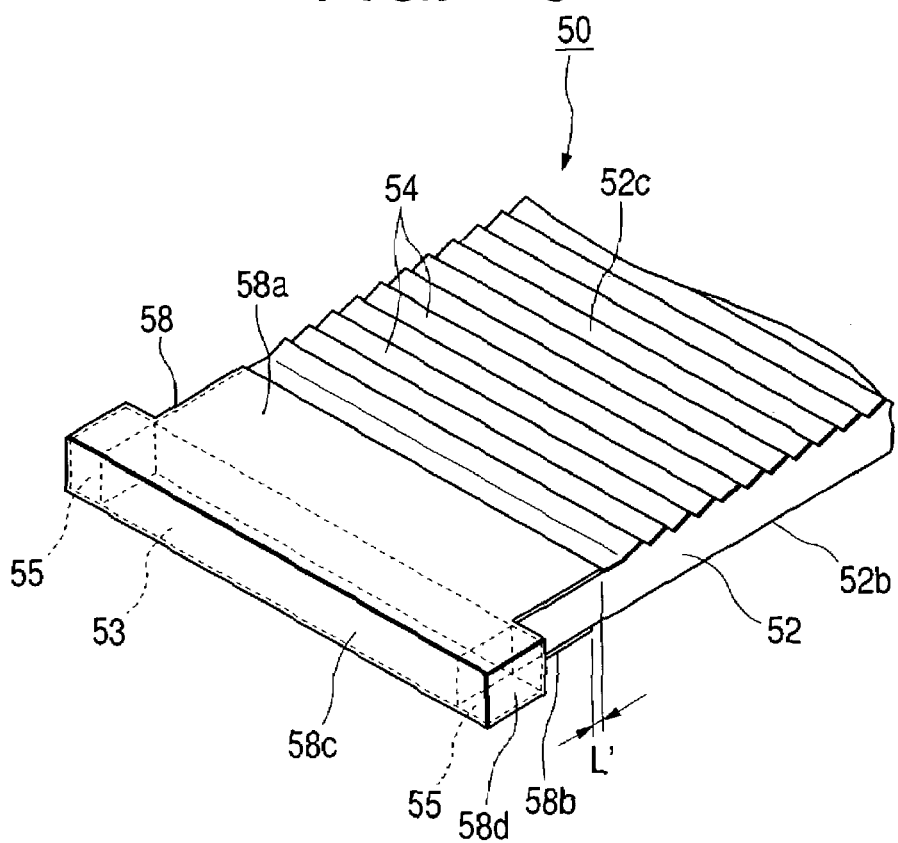
FIG. 10 is a partial perspective view showing a configuration of a frontlight that is a second embodiment of the invention.
Figure 11:
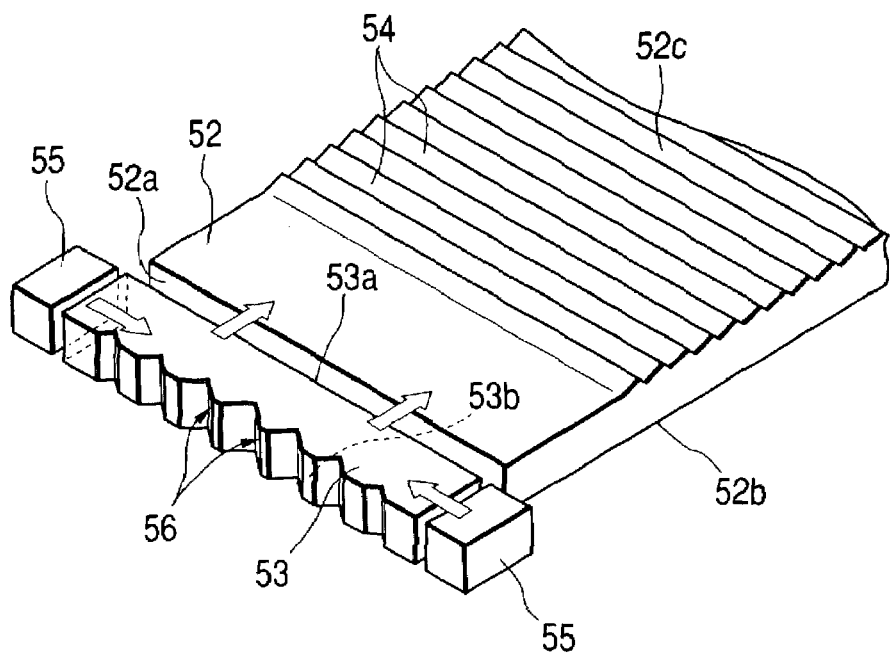
FIG. 11 is a partial perspective view showing a state where a cover member is removed from the frontlight shown in FIG. 10.

FIG. 10 is a partial perspective view showing a configuration of a frontlight (planar light-emitting device) that is a second embodiment of the invention. Furthermore, FIG. 11 is a partial perspective view showing a state in which a cover member 58 described later is removed from the frontlight 50 shown in FIG. 10. The frontlight 50 shown in these drawings is constituted including a tabular light guide plate 52 made of a transparent resin material; a rod-like bar light guide (light guide) 53 disposed at a side end portion (one end portion on a shorter-side side of a rectangular light guide plate 52) on a side end surface 52a side of the light guide plate 52; light-emitting elements (light source) 55, 55 disposed at both end portions in a length direction of the bar light guide 53; and a cover member 58 that is adhered so as to cover the bar light guide 53 and the light-emitting elements 55, 55, as well as a side end portion on the bar light guide 53 side of the light guide plate 52.

The light guide plate 52, as shown in FIG. 11, is a transparent tabular member in which a side end surface 52a that faces the bar light guide 53 is an incidence surface, and a top surface thereof is a reflection surface 52c in which projection portions 54 that are substantially in parallel with the side end surface 52a and have an wedge-like side view are formed in stripe in parallel with each other is a reflection surface 52c. The light guide plate 52 is structured so that the light introduced from the side end surface 52a into the inside thereof is reflected at the reflection surface 52c, changed in its direction of propagation, and outputted from a surface (bottom surface in the drawing) on an opposite side of the reflection surface 52c.

Furthermore, the light guide plate 52 can be manufactured according to a method in which a resin material such as transparent acrylic resin is injection-molded in a tabular shape. Still furthermore, as the material constituting the light guide plate 52, the identical materials as that for the light guide plate 12 according to the previous embodiment can be selected.

Figure 15:
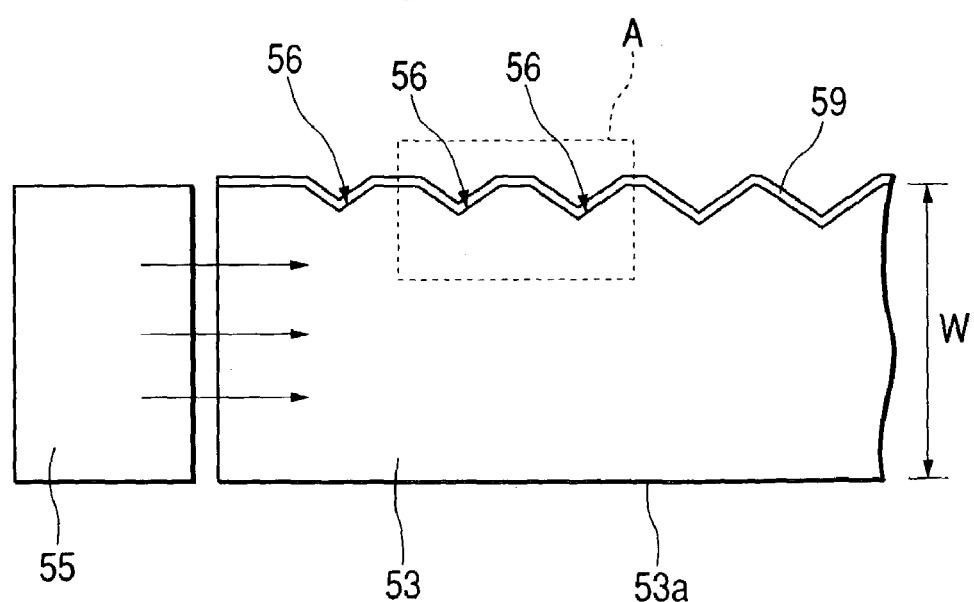
FIG. 15 is an explanatory diagram showing a reflection surface of the bar light guide.

The bar light guide 53 and the light-emitting elements 55 in this example are ones the same as that used in the first embodiment, and, as shown in FIG. 15, on a side surface of the light guide 53 wedge-like grooves 56 are formed to form a reflection surface 53b. The bar light guide 53 reflects the light that is outputted from the light-emitting elements 55, 55 and introduced into the inside at a surface that constitutes these grooves 56, changes a propagation direction of the light toward the light guide plate 52, and irradiates the light onto the side end surface 52a of the light guide plate 52. The light introduced from the bar light guide 53 into the light guide plate 52 travels inside of the light guide plate 52, is reflected at the surface that constitutes the projections 54 formed on the reflection surface 52c, changed in its direction of propagation, and outputted from an exit surface (bottom surface in the drawing) of the light guide plate 52.

The cover member 58, as shown in FIG. 10, is a metal member that has a horseshoe sectional shape and is disposed with the bar light guide 53, the light-emitting elements 55, 55 at both ends thereof and a side end portion on the bar light guide 13 side of the light guide plate 52 covering. The cover member 58 is constituted including a reflection surface cover portion 58a that is a site disposed on the reflection surface side (top surface side in the drawing) of the light guide plate 52; an exit surface cover portion 58b that is a site disposed on the exit surface side (bottom surface side in the drawing) of the light guide plate 52; and a light guide cover portion 58c that is connected to the base portions and disposed facing the reflection surface 53b of the bar light guide 53.

Figure 12:
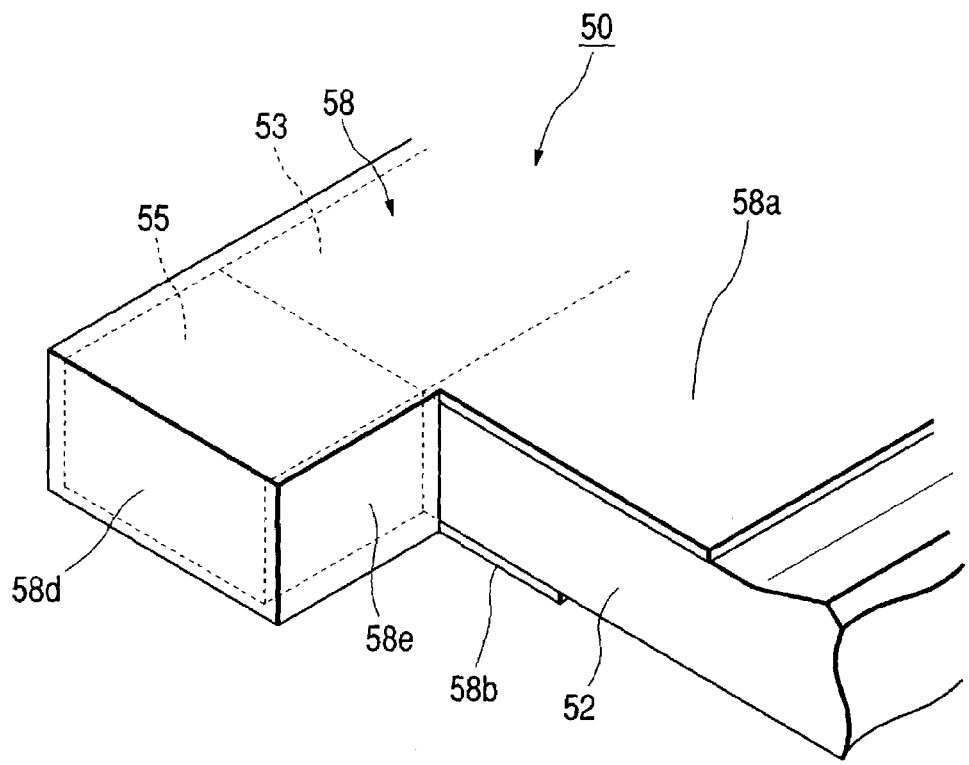
FIG. 12 is an enlarged perspective view showing relationship between a bar light guide, a light emitting element and a light guide plate according to the second embodiment.

Furthermore, FIG. 12 is an enlarged explanatory view for explaining a state in which the cover member 58 according to the embodiment is adhered to the bar light guide 53 and the light-emitting element 55.

As shown in the drawing, in the cover member 58 according to the embodiment, in order to cover the light-emitting element 55 projected from a side surface of the light guide plate 52, an outer surface cover portion 58d is formed so as to face an outer surface side (surface on a side opposite to a surface that faces the bar light guide 53) of the light-emitting element 55 and a side surface cover portion 58e is formed so as to face a side surface on the light guide plate 52 side of the light-emitting element 55.

One feature of the cover member 58 according to the embodiment is in that as shown in FIG. 10, the reflection surface cover portion 58a is formed more projected in a light guide direction (direction forwarding from the bar light guide 53 to the light guide plate 52) than the exit surface cover portion 58b, and a projection length L1 thereof is set at 0.5 mm or more. By thus constituting, the frontlight 50 according to the embodiment can realize a remarkable improvement in the brightness. Furthermore, the projection length L is preferable to be set at 0.7 mm or more, being more preferable to be set at 0.8 mm or more. By setting in the above range, a further improvement in the brightness can be realized. The operations thereof will be detailed in the following with reference to FIGS. 13 and 14.

Figure 13:
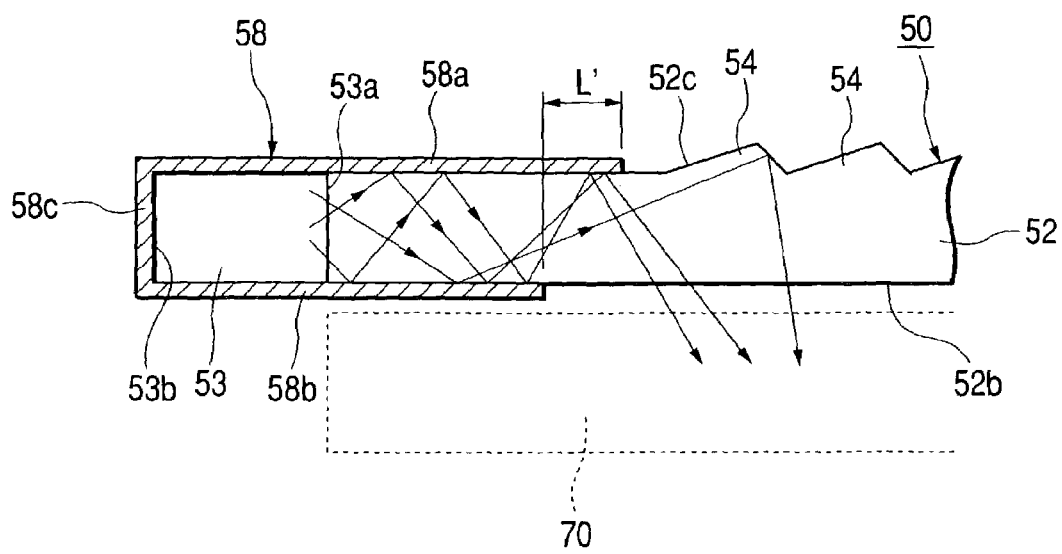
FIG. 13 is a partial sectional side view of the frontlight.

FIG. 13 is a partial sectional side view of a frontlight 50 shown in FIGS. 10 through 12, and FIG. 14 is a partial sectional side view of a frontlight in which the reflection surface cover portion 68a and the exit surface cover portion 68b are the same in the length.

Figure 14:
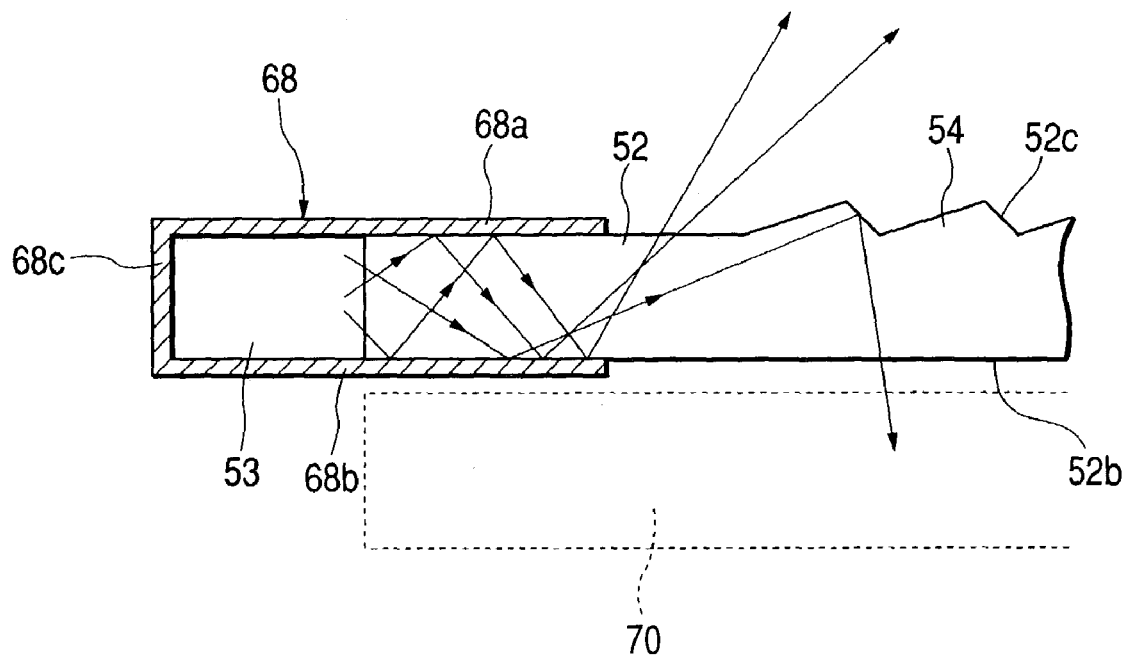
FIG. 14 is a partial sectional side view of one example of a frontlight whose reflection surface cover portion and exit surface cover portion are the same in length.

First, in the existing configuration shown in FIG. 14, the cover member 68 having a horseshoe sectional shape is constituted by grasping a side end portion of the light guide plate 52 from up and down with the bar light guide 53 accommodated inside thereof, and lengths in the light guide direction of the cover member 68 are made substantially identical on the reflection surface 52c side of the light guide plate 52 and on the exit surface 52b side thereof. In this structure, as shown in FIG. 14, light that is reflected at an inner surface side of a tip end portion of the exit surface cover portion 68b and propagates within the light guide plate 52 is outputted from the reflection surface 52c of the light guide plate 52 above the frontlight. The light, provided that a reflective liquid crystal display unit 70 is disposed on a bottom surface side of the frontlight, reaches a user without going through the liquid crystal display unit 70. The light not only does not contribute to the display of the liquid crystal display unit 70 but also causes blushing on the reflection surface 52c of the light guide plate 52, resulting in causing the deterioration of the visibility.

On the other hand, in the frontlight 50 according to the embodiment shown in FIGS. 10 through 13, the reflection surface cover portion 58a is formed longer in the light guide direction by a projection length L' than the exit surface cover portion 58b in the light guide direction.

In the configuration like this, the light outputted from the bar light guide 53, with reflections at an inner surface of the light guide plate 52 or an inner surface side of the cover member 58 repeating, propagates from the light guide 53 side to a direction toward the light guide plate 52. In the frontlight 50 according to the embodiment, the light reflected at the inner surface side of the tip end portion of the exit surface cover portion 58b is further reflected at the inner surface side of the tip end portion of the reflection surface cover portion 58a and outputted. Accordingly, as shown in, for instance, FIG. 13, when a reflective liquid crystal display unit 70 is disposed on a bottom surface side of the frontlight 50, the light reflected at the tip end portion of the reflection surface cover portion 58a also can be utilized as light that contributes to the display of the liquid crystal display unit 70. Thus, since the frontlight 50 according to the embodiment can increase an amount of exit light from the exit surface 52b of the light guide plate 52 and also can suppress the light from the reflection surface 52c of the light guide plate 52 from leaking, a frontlight that can realize an appreciable brightness improvement in comparison with an existing frontlight, can cause the blushing with difficulty, and is excellent in the visibility can be formed.

Figure 16:
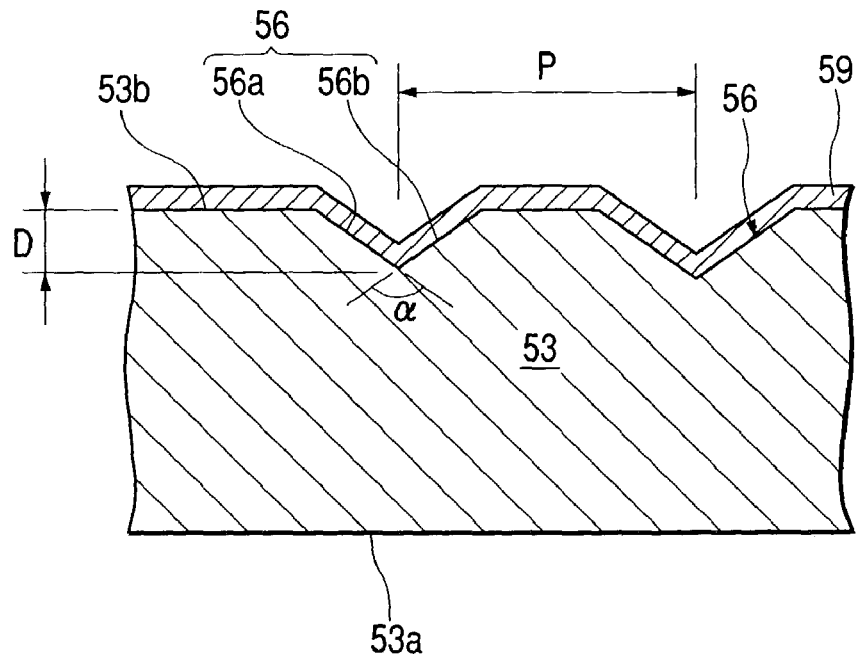
FIG. 16 is a partial enlargement sectional view of the bar light guide.
Figure 17:
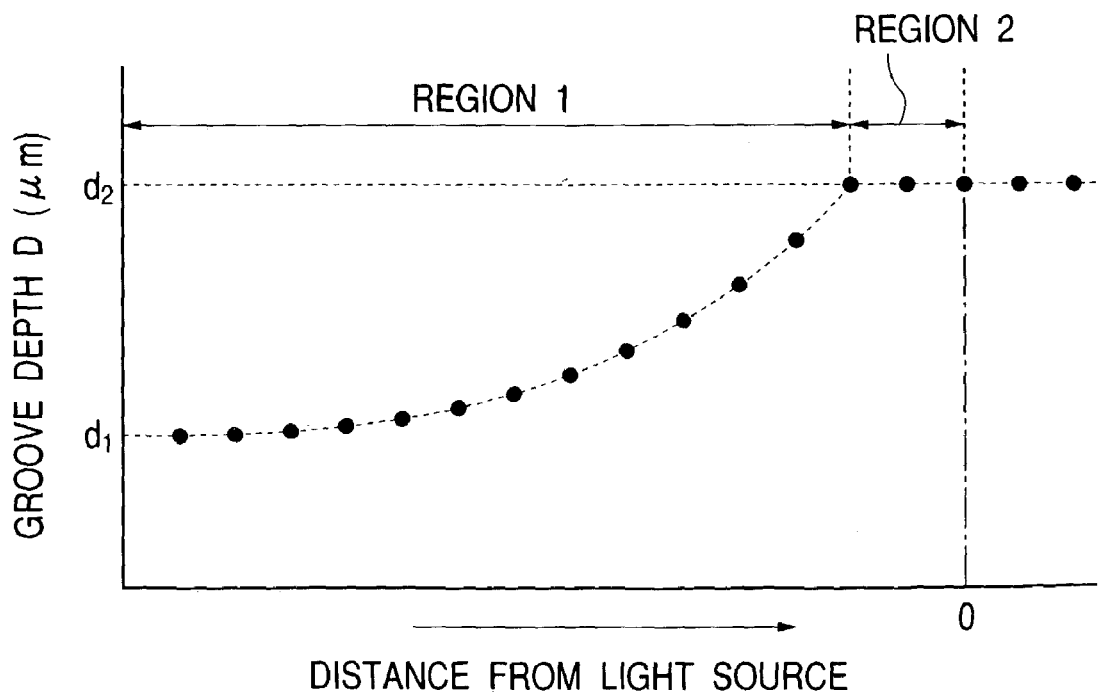
FIG. 17 is a graph showing relationship between a depth of a groove formed in the bar light guide shown in FIG. 11 and a distance from a light source.

In the bar light guide 53 of the frontlight 50 according to the embodiment, as shown in FIG. 16, in the grooves 56 formed on the reflection surface 53b, an angle that slope portions 56a, 56b form is made in the above range, and depths D of the grooves shown in FIG. 16 are also constituted controlled at predetermined depths. The depths D of the grooves 56 will be detailed in the following with reference to FIG. 17. FIG. 17 is a graph that shows relationship between the depths D of the grooves 56 formed on the reflection surface 53b of the light guide 53 and distances between the light-emitting element 55 and the respective grooves 56.

In FIG. 17, the depths of the grooves 56 from a center of the light guide 53 to one light-emitting element 55 are shown. Relationship between the distances up to the other light-emitting element 55 and the depths D of the grooves is symmetrical with respect to the center of the light guide 53. That is, the depths D of two grooves 56 that are equally distanced from the center of the light guide 53 are the same.

The depths D of the grooves 56 in the frontlight 50 according to the embodiment, as shown in FIG. 17, are formed differently between a region 1 that is the neighborhood of the center portion of the light guide 53 and a region 2 from the outside of the region 1 to the light-emitting element 55. That is, in the region 1 that is the center portion side of the light guide 53, the depths D of the grooves 56 are formed constant at a depth $d_2$, and in the region 2, the depth of the groove 56 nearest to the light-emitting element 55 is set at $d_1$ and the closer to the center of the light guide 53 the groves 56 are, the deeper the grooves 56 are formed. In the region 2, the relationship between the distance from the light-emitting element 55 to the groove 56 and the depth D of the groove 56 is formed according to a quadratic function or an exponential function. That is, a depth D of a groove 56, with a distance t from the light-emitting element 55, can be expressed by a relational expression $D=a \times t^2+b \times t+d_1$ (a and b are constants) or $D=c \times e^t+d_1$ (c is a constant), and constants contained in the relational expressions may be appropriately adjusted to the best values according to a dimension such as the length of the light guide 53 and so on.

More specifically, when the length of the bar light guide 53 is substantially 40 to 100 mm, the groove depths $d_1$ and $d_2$ shown in FIG. 17 are set at substantially 20 μm and 50 μm, respectively, and in the region 2 the groove depths D are preferably formed so as to sequentially increase according to the quadratic-function or exponential function from 20 μm at the light-emitting element 55 side to the center of the bar light guide 53.

Thus, the frontlight 50 according to the embodiment, since the bar light guide 53 thereof is constituted controlled as mentioned above, can increase an amount of light that is introduced from the bar light guide 53 into the light guide plate 52 and can improve the uniformity thereof. Thereby, an increase in the amount of light outputted from the exit surface of the light guide plate 52 and an improvement in the uniformity of the exit light can be realized. In addition, owing to the disposition of the cover member 58 having the above configuration, light can be suppressed from leaking from a top surface (reflection surface 52c) of the light guide plate 52, and the light that has leaked so far to the top surface can be outputted toward a bottom surface of the light guide plate 52, resulting in realizing an improvement in the brightness of the frontlight.

(Liquid Crystal Display Device)

Figure 18:
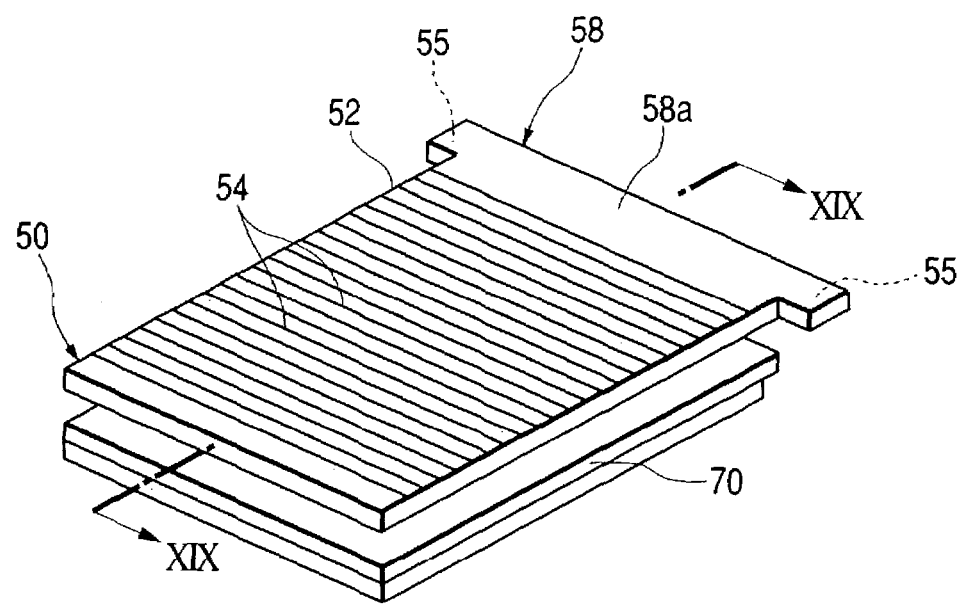
FIG. 18 is a perspective view showing one example of a liquid crystal display device provided with the frontlight according to the embodiment shown in FIG. 10.
Figure 19:
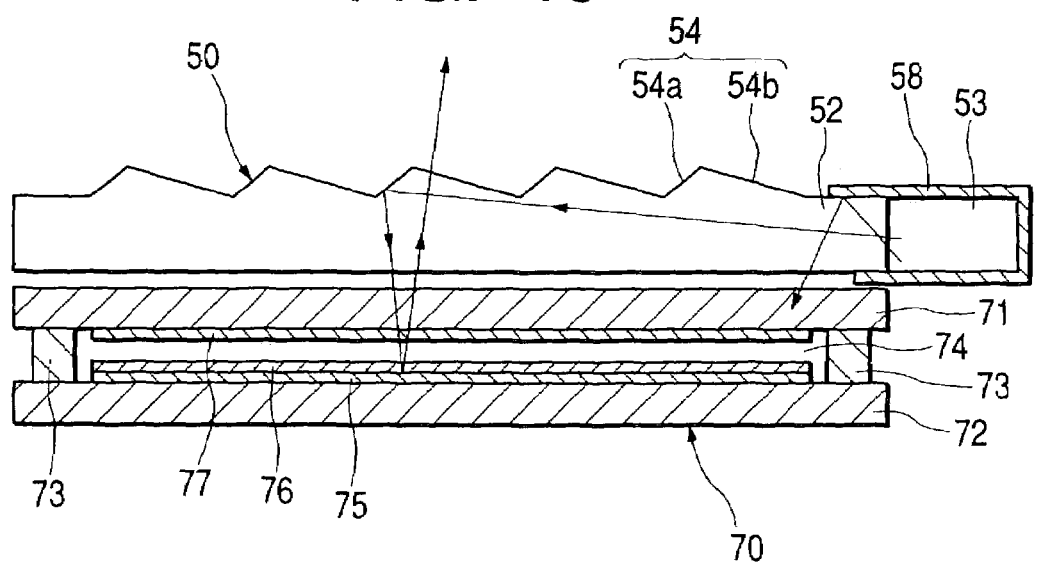
FIG. 19 is a sectional diagrammatic view along a XIX—XIX line of the liquid crystal display device shown in FIG. 18.
Figure 20:
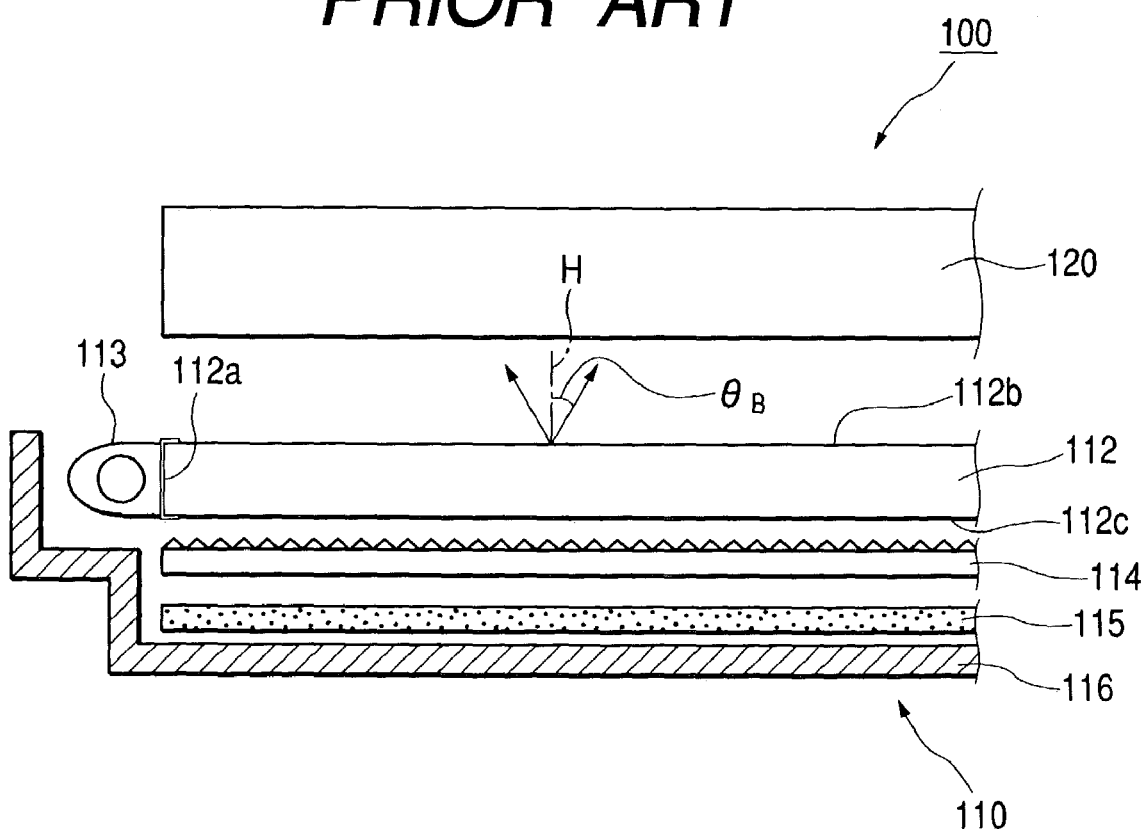
FIG. 20 is a partial sectional view showing one structural example of a backlight provided with an existing cold cathode tube and a liquid crystal display unit.

In the next place, an example of a liquid crystal display device provided with the frontlight 50 according to the embodiment will be explained. FIG. 18 is a perspective view showing one example of a liquid crystal display device equipped with the frontlight 50 shown in FIG. 10, and FIG. 19 is a schematic sectional view along a XIX—XIX line shown in FIG. 18. The liquid crystal display device shown in the drawings comprises the frontlight 50 according to the embodiment and a reflective black-and-white liquid crystal display unit 70 disposed at a rear side thereof.

The liquid crystal display unit 70 is, as shown in FIG. 19, constituted by connecting and integrating with a sealing material 74 a first substrate 71 and a second substrate 72 that face each other with a liquid crystal layer 73 interposed therebetween. On the liquid crystal layer 73 side of the first substrate 71, a display circuit 77 that includes an electrode layer and an alignment film and drives and controls the liquid crystal layer 73 is formed, and on the liquid crystal layer 73 side of the second substrate 72, a reflection film 75 that reflects the light incident on the liquid crystal display unit 70 and a display circuit 76 that includes an electrode layer and an alignment film and drives and controls the liquid crystal layer 73 are sequentially laminated. Furthermore, the reflection film 75 may be formed with a concavoconvex shape on a surface thereof to diffuse the reflected light.

In the liquid crystal display device according to the above configuration, the light outputted from the light-emitting element 55 is firstly introduced into the bar light guide 53 followed by being reflected at the reflection surface 53b of the bar light guide 53 to change its propagation direction, and is introduced into the light guide plate 52 from a side end surface of the light guide plate 52 disposed facing the exit surface of the bar light guide 53. The light traveling inside of the light guide plate 52 is reflected at the slope portion 54a of the reflection surface 52c of the light guide plate 52, thereby the propagation direction thereof is changed, and the light that illuminates the liquid crystal display unit 70 is outputted from the exit surface 52b of the light guide plate 52.

Subsequently, the light inputted into the liquid crystal display unit 70 goes through the first substrate 71, the display circuit 77, the liquid crystal layer 73, and the display circuit 76 and reaches the reflection film 75, is reflected by the reflection film 75, and returned again to the liquid crystal layer 73 side. The reflected light is outputted from a top surface side of the liquid crystal display unit 70, transmits through the light guide plate 52 and reaches a user. Thus, the liquid crystal display device according to the invention, when the frontlight 50 according to the invention is used as a light source of a reflective liquid crystal display unit 70, allows seeing the display even in a dark place where sufficient ambient light cannot be obtained. Furthermore, when the liquid crystal display unit 70 is provided with the frontlight 50 according to the invention, an amount of light to be irradiated to the liquid crystal display unit 70 can be increased, resulting in obtaining brighter display. Still furthermore, since the light is suppressed from leaking to a top surface side of the frontlight 50, the lowering of the visibility due to the blushing can be suppressed.

Furthermore, similarly to the case of the previous embodiment, the LED (light-emitting diode) used as the light-emitting element 55 can be any one that is capable of emitting green color, bluish green color, blue color, orange color, red color, or yellowish green color.

Furthermore, among these, in the case of more brightness being demanded, the green emitting light-emitting diode may be changed to the yellowish green emitting one. Still furthermore, in order to endow the display with the fashionability, the red- or orange-emitting light-emitting diode may be effectively used.

The light-emitting diodes capable of emitting these colors are characterized in that the power consumption is such small as substantially in the range of 2.0 to 2.5 mW/cm$^2$, a higher brightness such as substantially 5 to 10 cd/cm$^2$ can be easily obtained, a longer life such as 10,000 h or more can be obtained, the noise is generated with difficulty, and the cost is cheap (for instance, substantially 20 to 30 Japanese Yen a piece). The light-emitting diodes capable of emitting these colors, because of coloring, cannot be applied as a frontlight of a color display type liquid crystal display unit. However, these can be applied, without problems, to a black-and-white display type liquid crystal display unit 70 such as one according to the embodiment. Accordingly, when the light-emitting diode having one of the respective colors is used, a frontlight display liquid crystal display device 70 that is low in the power consumption and has a brighter display mode with respect to the low power consumption can be obtained.

As explained above, the invention is constituted including a light guide plate; a light guide provided to one side end portion thereof; and a light source; wherein one surface side of the light guide plate is formed into a concavoconvex reflection surface; the other surface side of the light guide plate is formed into an exit surface; the reflection surface is provided with a plurality of stripe-like grooves formed of a gentle slope portion and a steep slope portion; and a subject to be irradiated is disposed outside of the exit surface. Accordingly, light outputted from the light source is reflected at the steep slope portion and can be irradiated from the exit surface of the light guide plate onto the subject to be irradiated. Thus, the subject to be irradiated can be illuminated from a rear side thereof, resulting in allowing functioning as a backlight.

In the backlight according to the invention, the light source is formed of a light-emitting diode of any one color of green, bluish green, and blue color. Since the light-emitting diode having one of these colors can be cheaply obtained, it contributes to the cost reduction as the light source. Furthermore, in comparison with a structure where an EL element is used as the light source, since the light-emitting diode generates less noise, there is no need of noise countermeasure, that is, there is no need of shield or a noise reduction circuit, resulting in contributing to the cost reduction.

Furthermore, since the light-emitting diode having one of these colors is higher in the brightness relative to the power consumption, a brighter backlight can be cheaply provided.

In the backlight according to the invention, the steep slope portion that constitutes the groove is disposed on a side closer to the light source side than the gentle slope portion. Accordingly, the steep slope portion assuredly guides the light from the exit surface of the light guide plate to a side of the subject to be irradiated. As a result, a brighter backlight can be easily obtained.

In the backlight according to the invention, the cover member having at least the reflection surface cover portion that covers the side end portion on the reflection surface side of the light guide plate, the light guide cover portion that covers the light guide, and the exit surface cover portion that covers the side end portion on the exit surface side of the light guide plate is adhered so as to cover the light guide and the side end portion of the light guide plate. Accordingly, light leakage from the side end portion side of the light guide plate and the light guide side can be made smaller and the light introduced into the light guide plate can be increased, resulting in an improvement in the brightness as the backlight.

In the backlight according to the invention, since the reflection surface is formed on an inner surface side of the cover member, an amount of light that is reflected inside of the light guide and inputted into the light guide plate side can be increased, resulting in an improvement in the brightness as the backlight.

Since the liquid crystal display device according to the invention is provided with the backlight in which the light outputted from the light source is reflected at the steep slope portion and can be irradiated from the exit surface of the light guide plate onto the object to be irradiated, the transmissive or semi-transmissive liquid crystal display unit can be illuminated from a rear side thereof.

In order to overcome the above problems, in the liquid crystal display device according to the invention, the liquid crystal display unit is a black-and-white display type and the light source is made of the light-emitting diode having any one color of green, bluish green and blue color. When the light-emitting diode is used as the light source, in comparison with the EL element, the power consumption is smaller, and higher brightness relative to the power consumption can be obtained. Furthermore, the light-emitting diode having any one color of green, bluish green and blue color can be easily obtained and cheap, resulting in contributing to the cost reduction. Furthermore, in comparison with a structure where the EL element is used as the light source, the light-emitting diode is less in the noise generation. Accordingly, since there is no need of noise countermeasure, there is no need of shield and noise reduction circuit, resulting in contributing to the cost reduction.

Furthermore, the light-emitting diodes having these colors are higher in the obtained brightness relative to the power consumption, resulting in cheaply providing a brighter backlight.

Still furthermore, when one of the light-emitting diodes having these colors is used as the light source, colored light illuminates the liquid crystal display unit from the rear surface side thereof. However, when the liquid crystal display unit is not a color display type but a black-and-white display type, there is no particular problem, and a brighter display mode can be cheaply obtained.

In order to overcome the above problems, in the liquid crystal display device according to the invention, the steep slope portion that constitutes the groove is disposed closer to the light source side than the gentle slope portion, and the light outputted from the light source is reflected by the steep slope portion and can be irradiated from the exit surface of the light guide plate onto the subject to be irradiated. Accordingly, the subject to be irradiated can be illuminated from the rear side thereof, and thereby allowing functioning as a backlight. Thus, a liquid crystal display having transmission mode display or semi-transmission display mode that utilizes illumination light from the rear surface side can be obtained.

In the liquid crystal display device according to the invention, the cover member is disposed on front and rear sides of the side end portion of the light guide plate and a periphery side of the light guide, thereby the light leakage from the side end portion side of the light guide plate and the light guide side can be made smaller, and the light introduced into the light guide plate can be increased. Accordingly, the brightness as the backlight can be improved, resulting in providing a liquid crystal display unit of brighter display.

In order to overcome the above problems, in the liquid crystal display device according to the invention, a reflection surface may be formed on an inner surface side of the cover member. Since the liquid crystal display device is provided with a brighter backlight, a liquid crystal display unit of brighter display can be provided.

In the frontlight according to the invention, the light source includes a light-emitting diode of any one color of green, bluish green, blue, orange, red and yellowish green color. Since the light-emitting diode having one of these colors can be cheaply obtained, it contributes to the cost reduction as the light source. Furthermore, in comparison with a structure where an EL element is used as the light source, since the light-emitting diode generates less noise, there is no need of noise countermeasure, that is, there is no need of shield or a noise reduction circuit, resulting in contributing to the cost reduction.

Furthermore, since the light-emitting diode having one of these colors is higher in the obtained brightness relative to the power consumption, a brighter frontlight can be cheaply provided.

In the frontlight according to the invention, the steep slope portion that constitutes the groove is disposed on a side closer to the light source side than the gentle slope portion. Accordingly, the steep slope portion assuredly guides the light from the exit surface of the light guide plate to a side of the subject to be irradiated. As a result, a brighter frontlight can be easily obtained.

Furthermore, when the liquid crystal display device is provided with the frontlight, since higher brightness can be obtained relative to the power consumption, a brighter liquid crystal display device can be cheaply provided.

What is claimed is:

1. An illuminator adjacent to a surface of an object, comprising:
   a light guide plate having a reflection surface side and an exit surface side;
   an intermediate light guide disposed along an end surface of one side of the light guide plate;
   a light source disposed adjacent to the intermediate light guide; and
   a cover member attached so as to cover at least the intermediate light guide and an end portion of the light guide plate, the cover member having at least a reflection surface side cover portion that covers an end portion on a reflection surface side of the light guide plate; a light guide cover portion that covers the intermediate light guide; and an exit surface side cover portion that covers an end portion on the exit surface side of the light guide plate,
   wherein a portion of the reflection surface side of the light guide plate comprises a reflection surface having a concavoconvex shape so as to reflect light propagating inside thereof; a portion of the exit surface side of the light guide plate comprises an exit surface that outputs the light reflected by the reflection surface; the reflection surface having a plurality of grooves formed of a gentle slope portion and a steep slope portion, the steep slope portion having an angle of inclination steeper than that of the gentle slope portion; and the object to be illuminated is disposed outside of the exit surface, the reflection surface side cover portion extending further towards the reflection surface of the light guide plate from the intermediate light guide than the exit surface cover portion.

2. A liquid crystal display device, comprising:
   an illuminator that includes a light guide plate having a reflection surface side and an exit surface side; an intermediate light guide disposed along an end surface of the light guide plate; and a light source disposed adjacent to an end portion of the intermediate light guide; wherein a portion of the reflection surface side of the light guide plate comprises a reflection surface having a concavoconvex shape so as to reflect light propagating inside thereof; a portion of the exit surface side of the light guide plate comprises an exit surface that outputs the light reflected by the reflection surface; and the reflection surface having a plurality of grooves formed of a gentle slope portion and a steep slope portion, the steep slope portion having an angle of inclination steeper than that of the gentle slope portion, a cover member attached so as to cover at least the intermediate light guide and an end portion of the light guide plate, the cover member having at least a reflection surface side cover portion that covers and end portion on the reflection surface side of the light guide plate; a light guide cover portion that covers the intermediate light guide; and an exit surface side cover portion that covers an end portion on the exit surface side of the light guide plate, the reflection surface side cover portion extending further towards the reflection surface of the light guide plate from the intermediate light guide than the exit surface side cover portion; and
   a liquid crystal display unit disposed outside of the exit surface of the illuminator.

3. The backlight of claim 2, wherein the reflection surface cover portion extends further from the intermediate light guide than the exit surface cover portion by at least 0.5 millimeters.

4. The backlight of claim 3, wherein the reflection surface cover portion extends further from the intermediate light guide than the exit surface cover portion by at least 0.8 millimeters.

5. A backlight that is disposed on a rear surface side of a object to be irradiated and illuminates the object to be irradiated from the rear surface side, comprising:
   a light guide plate having a reflection surface side and a exit surface side;
   an intermediate light guide disposed along an end surface of the light guide plate; and
   a light source disposed adjacent to the intermediate light guide; and
   a cover member attached so as to cover at least the intermediate light guide and an end portion of the light guide plate, the cover member having at least a reflection surface side cover portion that covers a side end portion on the reflection surface side of the light guide plate; a light guide cover portion that covers the intermediate light guide; and an exit surface side cover portion that covers an end portion on the exit surface side of the light guide plate,
   wherein a portion of the reflection surface side of the light guide plate comprises a reflection surface having a concavoconvex shape so as to reflect light propagating inside thereof; a portion of the exit surface side of the light guide plate comprises the exit surface that outputs the light reflected by the reflection surface; the reflection surface having a plurality of grooves formed of a gentle slope portion and a steep slope portion, the steep slope portion having an angle of inclination steeper than that of the gentle slope portion, the reflection surface side cover portion extending further towards the reflection surface of the light guide plate from the intermediate light guide than the exit surface side cover portion, and the object to be irradiated is disposed outside of the exit surface.

6. The backlight of claim 5:
wherein the light source comprises a light-emitting diode having any one color of green, bluish green, blue, orange, red and yellowish green color.

7. The backlight of claim 6:
wherein the object to be irradiated comprises black-and-white transmissive or semi-transmissive liquid crystal display unit.

8. The backlight of claim 5:
wherein the cover member comprises a metal plate and wherein on an inner surface side thereof a reflection surface is formed.

9. The backlight of claim 5, wherein the reflection surface cover portion extends further from the intermediate light guide than the exit surface cover portion by at least 0.5 millimeters.

10. The backlight of claim 9, wherein the reflection surface cover portion extends further from the intermediate light guide than the exit surface cover portion by at least 0.8 millimeters.

11. The backlight of claim 5, wherein a surface of the intermediate light guide is contiguous with the end surface.

12. The backlight of claim 5, wherein the cover member has a light-guide-plate side portion that covers a light-guide-plate side surface of the of the light source, and a rear light-source portion that covers a surface of the light source disposed distal from, and parallel to, a surface of the light source facing the intermediate light guide.

13. A liquid crystal display device, comprising:
a backlight that includes a light guide plate having a reflection surface side and an exit surface side; an intermediate light guide disposed along an end surface of the light guide plate; and a light source disposed adjacent to an end portion of the intermediate light guide; wherein a portion of the reflector surface side of the light guide plate comprises a reflection surface having a concavoconvex shape so as to reflect light propagating inside thereof; a portion of the exit surface side of the light guide plate comprises an exit surface that outputs the light reflected by the reflection surface; and the reflection surface having a plurality of grooves formed of a gentle slope portion and a steep slope portion, the steep slope portion having an angle of inclination steeper than that of the gentle slope portion a cover member attached so as to cover at least the intermediate light guide and a side end portion of the light guide plate, the cover member having at least a reflection surface side cover portion that covers a end portion on a reflection surface side of the light guide plate; a light guide cover portion that covers the intermediate light guide; and an exit surface side cover portion that covers an end portion on the exit surface side of the light guide plate, the reflection surface side cover portion extending further towards the reflection surface of the light guide plate from the intermediate light guide than the exit surface cover portion; and
a transmissive or semi-transmissive liquid crystal display unit disposed outside of the exit surface of the backlight.

14. The liquid crystal display device of claim 13 wherein the liquid crystal display unit is a transmissive or semi-transmissive black-and-white display.

15. The liquid crystal display device of claim 13 wherein the light source comprises a light-emitting diode having any one color of green, bluish green, blue, orange, red and yellowish green color.

16. The liquid crystal display device of claim 13 wherein the cover member comprises a metal plate and on an inner surface thereof a reflection surface is formed.

17. The backlight of claim 13, wherein the reflection surface cover portion extends further from the intermediate light guide than the exit surface cover portion by at least 0.5 millimeters.

18. The backlight of claim 17, wherein the reflection surface cover portion extends further from the intermediate light guide than the exit surface cover by at least 0.8 millimeters.

* * * * *